(12) United States Patent
Hashimoto et al.

(10) Patent No.: US 7,673,155 B2
(45) Date of Patent: Mar. 2, 2010

(54) MICROPROCESSOR WITH IMPROVED TASK MANAGEMENT AND TABLE MANAGEMENT MECHANISM

(75) Inventors: Mikio Hashimoto, Kanagawa (JP);
Kensaku Fujimoto, Kanagawa (JP);
Kenji Shirakawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/118,291

(22) Filed: May 9, 2008

(65) Prior Publication Data

US 2009/0006864 A1    Jan. 1, 2009

Related U.S. Application Data

(63) Continuation of application No. 10/259,379, filed on Sep. 30, 2002, now Pat. No. 7,424,622.

(30) Foreign Application Priority Data

Sep. 28, 2001  (JP) .............................. 2001-304488

(51) Int. Cl.
*H04L 9/32* (2006.01)
(52) U.S. Cl. ..................... 713/194; 380/44; 380/226
(58) Field of Classification Search ................ 713/1, 713/2, 188, 194, 168, 170, 190; 380/200, 380/201, 255, 277, 44, 228; 726/2
See application file for complete search history.

(56) References Cited

U.S. PATENT DOCUMENTS 3,976,978 A  *  8/1976  Patterson et al. ............ 711/208

| | | |
|---|---|---|
| 4,168,396 A | 9/1979 | Best |
| 4,463,420 A | 7/1984 | Fletcher |
| 4,558,176 A | 12/1985 | Arnold et al. |
| 4,887,296 A  * | 12/1989 | Horne .......................... 380/239 |

(Continued)

FOREIGN PATENT DOCUMENTS

JP            60-79446            5/1985

(Continued)

*Primary Examiner*—Kimyen Vu
*Assistant Examiner*—Joseph Pan
(74) *Attorney, Agent, or Firm*—Oblon, Spivak, McClelland, Maier & Neustadt, L.L.P.

(57) ABSTRACT

A tamper resistant microprocessor has a task state table for assigning a task identifier to a task that can take a plurality of states, and storing a state of the task in correspondence to the task identifier; a task register for storing the task identifier of a currently executed task; an interface for reading a program stored in a form encrypted by using a program key at an external memory, in units of cache lines, when a request for the task is made; an encryption processing unit for generating decryption keys that are different for different cache lines, according to the program key, and decrypt a content read by the interface; a cache memory formed by a plurality of cache lines each having a tag, for storing the task identifier corresponding to a decryption key used in decrypting each cache line in the tag of each cache line; and an access check unit for comparing the task identifier stored in the tag of each cache line with a value of the task register, and discarding a content of each cache line when the task identifier in the tag and the value of the task register do not coincide.

6 Claims, 17 Drawing Sheets

U.S. PATENT DOCUMENTS

| | | | |
|---|---|---|---|
| 5,034,980 A | 7/1991 | Kubota | |
| 5,097,533 A * | 3/1992 | Burger et al. | 719/328 |
| 5,319,705 A * | 6/1994 | Halter et al. | 705/54 |
| 5,666,411 A | 9/1997 | McCarty | |
| 5,790,804 A * | 8/1998 | Osborne | 709/245 |
| 5,805,711 A | 9/1998 | Windel et al. | |
| 6,061,449 A * | 5/2000 | Candelore et al. | 380/28 |
| 6,311,290 B1 * | 10/2001 | Hasbun et al. | 714/15 |
| 6,427,162 B1 | 7/2002 | Mohammed | |
| 6,678,722 B1 * | 1/2004 | Kanoh | 709/212 |
| 6,816,488 B1 | 11/2004 | Merchant et al. | |
| 2001/0018736 A1 | 8/2001 | Hashimoto et al. | |
| 2001/0031050 A1 | 10/2001 | Domstedt et al. | |
| 2002/0053684 A1 | 5/2002 | Chauvel et al. | |

FOREIGN PATENT DOCUMENTS

| | | |
|---|---|---|
| JP | 3-204744 | 9/1991 |
| JP | 3-235143 | 10/1991 |
| JP | 3-235144 | 10/1991 |
| JP | 6-266610 | 9/1994 |
| JP | 6-266620 | 9/1994 |
| JP | 6-266621 | 9/1994 |
| JP | 6-282488 | 10/1994 |
| JP | 7-28703 | 1/1995 |
| JP | 7-311712 | 11/1995 |
| JP | 9-259044 | 10/1997 |
| KR | 2001-0082631 | 8/2001 |

* cited by examiner

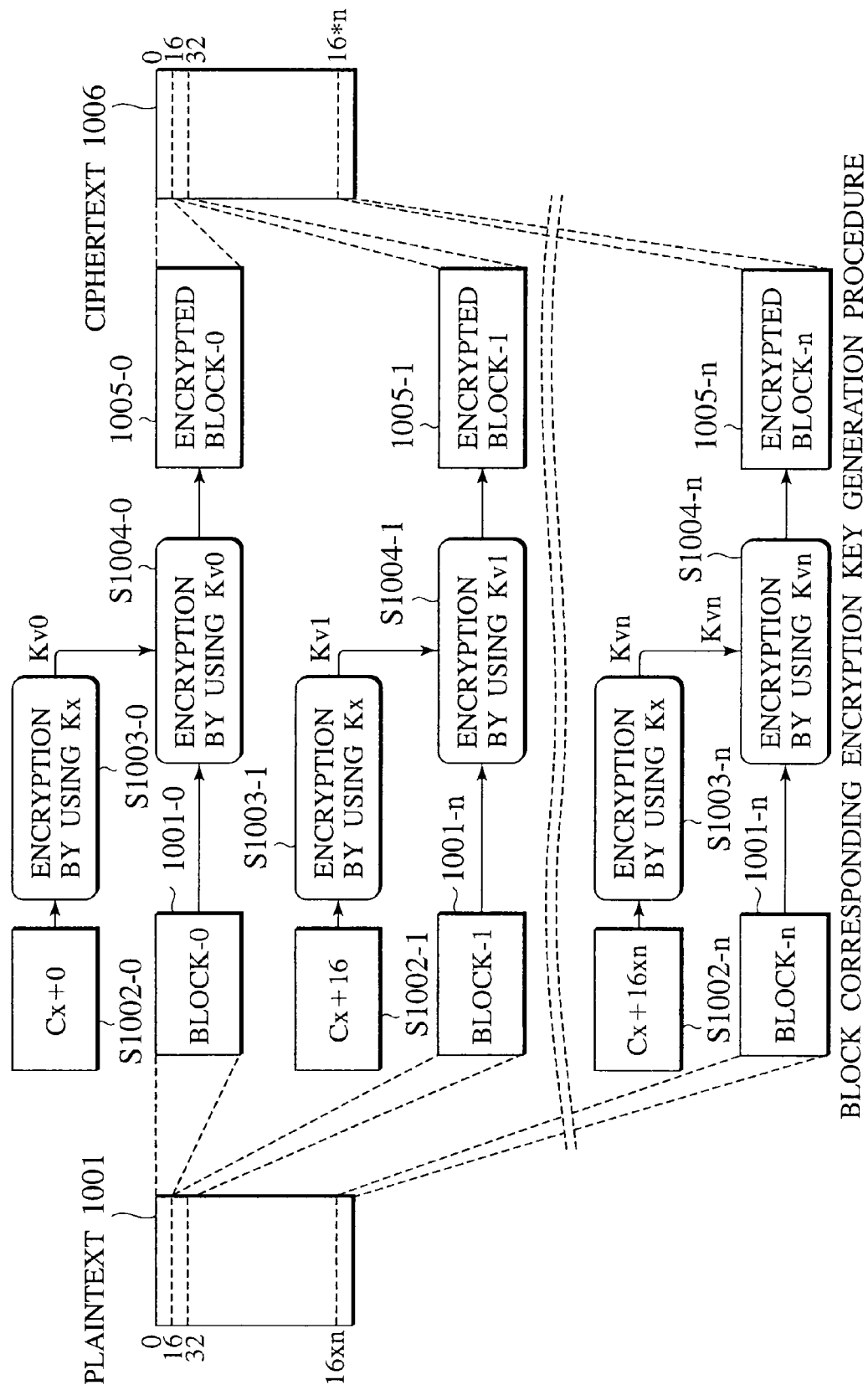

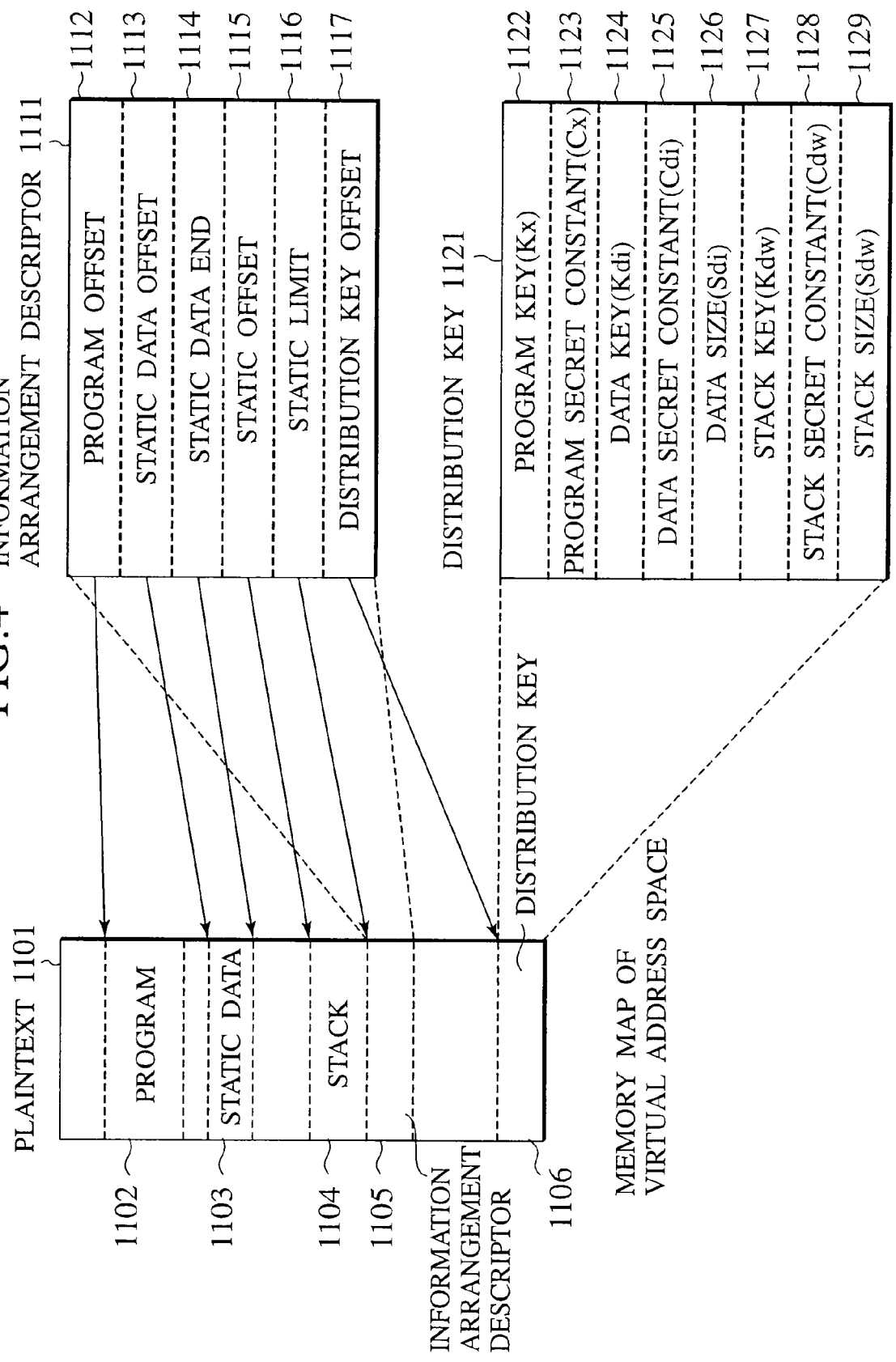

FIG.5

| COMMAND | OPERATION | STATE TRANSITION |
|---|---|---|
| register | REGISTRATION OF TASK | NULL→INIT |
| start | STARTING OF TASK | INIT→RUN |
| suspend | STORING OF SUSPENDED TASK STATE | STOPPED→SUSPEND |
| resume | RESUMING OF STORED TASK | SUSPEND→RUN |
| continue | RESUMING OF SUSPENDED TASK | STOPPED→RUN |
| delete | ENDING OF TASK (DELETION OF STATE) | (INIT, STOPPED, SUSPEND) →NULL |

TASK CONTROL COMMAND & STATE TRANSITION

FIG.6

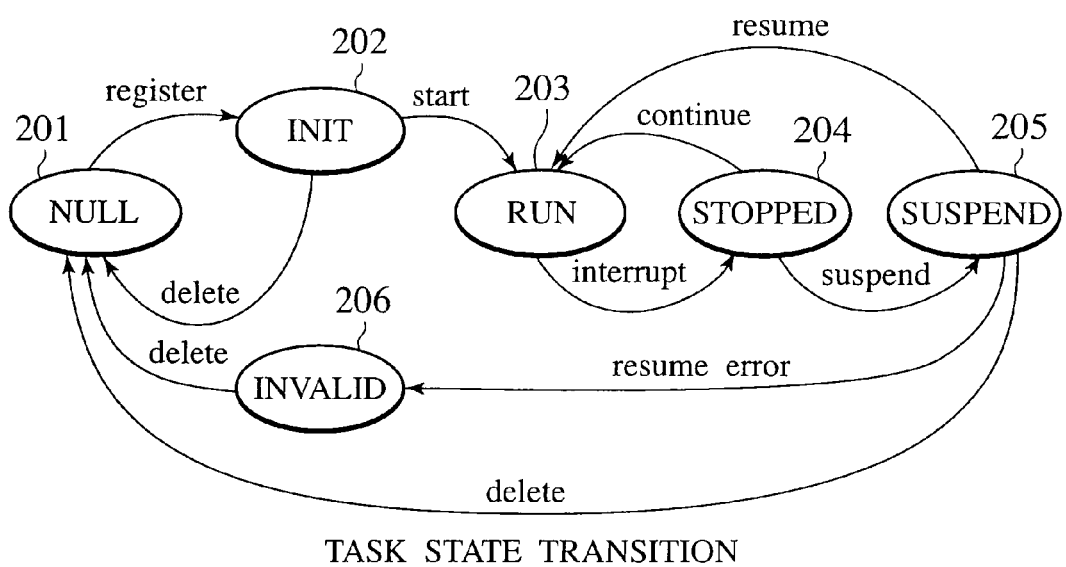

TASK STATE TRANSITION

MICROPROCESSOR WITH IMPROVED TASK MANAGEMENT AND TABLE MANAGEMENT MECHANISM

CROSS-REFERENCE TO RELATED APPLICATIONS

This application is a Continuation of U.S. patent application Ser. No. 10/259,379, filed Sep. 30, 2002, and claims priority to Japanese Patent Application No. 2001-304488, filed Sep. 28, 2001. The contents of U.S. patent application Ser. No. 10/259,379 are incorporated herein by reference in their entirety.

BACKGROUND OF THE INVENTION

1. Field of the Invention

The present invention relates to a microprocessor capable of preventing illegal alteration of execution codes and processing target data under a multi-task program execution environment.

2. Description of the Related Art

The open system in which hardware information of a computer for general user such as PC and system program information of the operation system (OS) are disclosed rather than being concealed is widely spread today. In the open system, the end-user can make any desired improvement by modifying the system program.

Under such a circumstance, in order to guarantee the copyright protection for data handled by application programs or the copyright protection for programs themselves, there is a need for hardware with a secret protection capability which is based on the presumption that the OS of the system can carry out hostile operations with respect to applications. Such hardware with a secret protection capability has been proposed especially in a form of a microprocessor (see commonly assigned co-pending U.S. patent application Ser. No. 09/781,158 and No. 09/781,284; and Lie et al., "Architectual Support for Copy and Tamper Resistant Software", Computer Architecture News 28(5), pp. 168-).

Such a microprocessor with a secret protection capability has a function for encrypting a program and data handled by that program under the multi-task environment in order to protect them from the peeping and the alteration. In the following, such a microprocessor will be referred to as a tamper resistant microprocessor.

The main purpose of the tamper resistant microprocessor is to protect the rights of the copyright owners of programs, contents and network services by protecting applications operated on the end-user's system. More specifically, three major concerns are (1) the protection of algorithms implemented in programs, (2) the protection of trade secrets and contents embedded in programs, and (3) the protection of the program operations from the alteration.

The protection of algorithms implemented in programs is necessary in order to protect the copyright owners of the programs. The protection of the trade secrets embedded in programs is necessary in order to prevent illegal copies of contents handled by the programs. The protection from the illegal alteration is necessary in order to protect the rights of the service providers, for example.

In the application in which a program that utilizes a network service exchanges a charging information with a server, it is particularly important to prevent the illegal alteration so that the charging information transmission operation is executed properly. As a practical example, it is well known that a program for reproducing DVD on PC was analyzed to obtain the trade secret for decrypting the encryption of DVD and a program (DeCSS) for illegally copying DVD was produced.

In the open system, mechanisms for simply protecting secrets of the application programs have been proposed conventionally, and the present inventors have been proposing a protection environment for protecting secrets independently from the OS that manages the system resources, for each one of a plurality of programs (programs from a plurality of different program vendors or a plurality of different programs from a single vendor) that are to be operated in a pseudo-parallel manner on a single system (see commonly assigned co-pending U.S. patent application Ser. Nos. 09/781,158, 09/781,284, 09/984,407 and 10/059,217, for example). Such a protection environment will be referred to as a "multi-party application protection environment".

FIG. 18 shows a general multi-party application protection environment. In FIG. 18, an exemplary case where a user 12 purchases a program from a vendor-1 21-1 among a plurality of software vendors 21-1 to 21-$n$ will be considered. A system 2 used by the user 12 has a built-in microprocessor, and this processor-A 3 has a secret key-A 5 unique to this processor. A public key-A 13 corresponding to the secret key-A is disclosed to the public.

The software vendor-1 develops a program 22-1, selects a program key-1 24-1 as an encryption key, and produced an encrypted program 23-1 by encrypting a plaintext program 22-1. Then, the software vendor-1 produces a distribution key-1 25-1 by encrypting the program key-1 by using the public key-A unique to the processor-A of a distribution target system 2.

Although not shown in the figure, the software vendor-1 also develops a plurality of different programs besides the program 22-1, selects program keys for respective programs, and produces encrypted programs and distribution keys. Here, only a single program will be described for the sake of explanation.

The software vendor-1 delivers the encrypted program 23-1 and the encrypted distribution key 25-1 to the target system 2 through a network. The delivered program 23-1 and distribution key 25-1 are stored into a secondary memory (a hard disk, for example) of the system. The program 23-1 contains execution codes and data (initialization data, etc.) and at a time of the execution, they are read out in the encrypted state to an external memory 8 provided outside of the microprocessor 3. The encrypted program on the external memory 8 will be referred to as a protected program.

The microprocessor-A reads the distribution key 25-1, and decrypts it by using the secret key-A corresponding to the public key-A to obtain the program key-1. The key decryption processing is carried out at a protection logic 6 inside the microprocessor.

Next, the microprocessor-A decrypts the program-1 by using the program key-1 and reads it into a cache memory 4. The decryption and the reading into the cache memory 4 is realized by a prescribed caching algorithm according to the execution of the program, for each part separately, so that the entire program is not read into the cache memory 4 at once. The program read into the cache memory 4 is in the plaintext state, so that it is executed at the core 6 similarly as the ordinary non-encrypted programs. A part for handling the program key-1 and the plaintext programs is executed by the core 6 of the processor-A, and there is no room for the OS to intervene. The contents of the cache memory 4 and the secret key 5 provided in the microprocessor cannot be read out directly from the external, except for the operations defined by the processor specification.

Note that, although not shown in the figure, for the plaintext information stored in the cache memory 4, an identifier for identifying the encryption key used in decrypting that plaintext information is attached to each line of the cache memory 4, in order to guarantee that the secret is maintained independently among programs even when the user purposes a plurality of different programs from a plurality of program vendors 21-1 to 21-*n*. The program keys are different for different programs of different program vendors so that the independence of the program can be guaranteed by setting a task of the cache line and the key used for decrypting it in correspondence.

Now, the problems to be solved by the present invention are as follows.

(1) In order to realize the task identification function, there is a need to have a table for maintaining the program key of each program in correspondence to the task ID, inside the microprocessor. The setting of such a table will be commanded by the OS that manages the system, so that there is a need to provide a function for operating the table from the OS program. This table operation function obviously must satisfy the secret protection requirement.

Also, the task corresponding key table plays a central role in the secret protection, but due to the finiteness of resources and the consideration of costs, it is impossible to increase the capacity of the table indefinitely. For this reason, which programs should be allocated with the entries of the table and how to re-utilize the entries must be managed by the OS according to the intention of the system user.

Such operations of the OS have a possibility of introducing a defect into the secret protection. For example, in a state where the task ID #1 is allocated to some program key X, suppose that the OS re-allocates the same task ID #1 to another program key Y. In this case, if the cache line to which the tag of the task ID #1 is assigned remains in the cache memory, this data can be read out from the program corresponding to the program key Y. This is in violation of the principle of the secret protection.

Thus, the first problem to be solved is to provide a task state management and table management mechanism for preventing such a violation.

(2) There are two types of the program encryption methods including a method in which the decryption processing is completed in units of cache lines, and a method in which data of a plurality of cache lines are required for the decryption of one cache line. The former method does not influence the memory capacity and the interchange in units of lines, but the latter method is associated with the following problems.

In the method in which data of a plurality of cache lines are required for the decryption of a cache line, when the random access to the memory occurs, there is a need to read the memory regions in front and behind of the required memory region. For this reason, a large overhead will be caused.

Also, as the decryption result depends on data of the neighboring lines, there is a possibility of the so called block interchange attack. The block interchange attack is an attack in which an attacker appropriately interchanges the block information encrypted according to the same secret so as to change the system state according to the intention of the attacker. For example, suppose that the attacker learns that a line P arranged at some address X is a portion corresponding to the charging operation, from the timing of the communication or the like. Then, suppose that the attacker also knows that the service provided by the program is not adversely affected even when another line Q that is encrypted by using the same program key is executed. In this case, when the line P is replaced by the line Q, the attacker can escape just the charging without affecting the service of the program. The similar attack is also applicable to data handled by the program.

The above problem can be resolved if a separate key is given to every block, but if the separate encryption key for each block is stored in the distribution key, the algorithm for encrypting the distribution key by using the public key becomes enormous, and causes the overhead in the decryption processing. Also, there arises a need to provide a table with an enormous capacity for managing such keys inside the microprocessor, so that it is not practical from viewpoints of the key distribution and the management cost.

In addition, the general program does not necessarily always have a predetermined address at which it is to be arranged, and the address at which it is to be arranged can be changed depending on a configuration of the target system (a configuration of the library and the shared memory to be shared with the other programs). This is called re-location. In the case of carrying out the encryption for each block, the problem of the re-location must be taken into account.

Thus, the second problem to be solved is to provide a microprocessor which has a small processing overhead, which makes the data interchange attack difficult, and which has a secret information management capability that accounts for the re-location.

(3) Three elements that constitute the application are a program (execution codes), data, and context information, but they are handled differently inside the processor. The execution codes and the data comprises the main body of the program, while the context is a state information to be saved on a memory for the purpose of resuming the task after the execution of the task is interrupted.

In general, the program inside the microprocessor will not be rewritten, but when data on the cache is changed, the data will be written back to the external memory.

Also, the program and the data are accessed in units of cache lines, but the context information often takes a size that cannot be stored into a single cache line. At a time of the context switching, information over a plurality of cache lines will be collectively read or written.

In exchanging these informations with different properties with the external memory, the separate encryption processings will be required, but the reduction of the hardware cost is also demanded.

Thus, the third problem to be solved is to provide a microprocessor that can commonly use the same encryption processing hardware for these informations.

BRIEF SUMMARY OF THE INVENTION

According to one aspect of the present invention there is provided a microprocessor, comprising: a task state table configured to assign a task identifier to a task that can take any one of a plurality of states, and store a state of the task in correspondence to the task identifier; a task register configured to store the task identifier of a currently executed task; an interface configured to read a program in units of cache lines, when a request for the task is made, the program being stored in an encrypted form obtained by using a program key at an external memory; an encryption processing unit configured to generate decryption keys that are different for different cache lines according to the program key, and decrypt a content read by the interface; a cache memory formed by a plurality of cache lines, each cache line having a tag, and configured to store the task identifier corresponding to a decryption key used in decrypting each cache line in the tag of each cache line; and an access check unit configured to compare the task identifier stored in the tag of each cache line with a value of the task register, and discard a content of each cache line when the task identifier in the tag and the value of the task register do not coincide.

According to another aspect of the present invention there is provided a microprocessor, comprising: a processor core configured to issue a reading request by specifying an address of an external memory in which a plurality of programs encrypted according to respectively unique program keys are stored; an interface configured to read a data block of the address of the external memory in response to the reading request from the processor core; a task key table configured to store the program key in correspondence to a task identifier assigned to each task which is a unit for controlling an execution of the program; an offset table configured to store a top address at which the program is arranged as an offset value for each task identifier; a key generation unit configured to generate a block corresponding key obtained by calculating a relative address value from the address specified by the reading request and the offset value specified by the task identifier in the offset table, and encrypting the relative address value by using the program key; an encryption processing unit configured to decrypt the data block read by the interface by using the block corresponding key; and a cache memory configured to read the data block decrypted by the encryption processing unit in units of cache lines.

According to another aspect of the present invention there is provided a microprocessor, comprising: a task register configured to store a task identifier of a currently executed task; a cache memory formed by a plurality of cache lines, configured to read data that are stored in an encrypted form at an external memory, in a plaintext form in correspondence to the task identifier in units of cache lines, when a task is requested; an encryption processing unit configured to decrypt the data in the encrypted form into plaintext form by using block corresponding encryption keys that are different for different cache lines; and an address range register configured to store an address range of the data in the encrypted form in correspondence to the task identifier; wherein when a request for another task is made during an execution of the task, the encryption processing unit encrypts a content of a cache line corresponding to the task identifier stored in the task register by using a block corresponding encryption key; and the cache memory is capable of writing encrypted data back to the external memory.

According to another aspect of the present invention there is provided a microprocessor, comprising: an interface configured to read execution codes and data of a program stored in an encrypted form at an external memory, in units of cache lines; a first cache memory having an offset table for storing an offset value which is a start address of the program, and configured to store the execution codes in a plaintext form in units of cache lines; a second cache memory having an address range register for storing an address range of the data, and configured to store the data in a plaintext form in units of cache lines; a key value table connected to the first cache memory and the second cache memory through a common bus, and configured to store an encryption key used in encrypting the program; and an encryption processing unit connected to the first cache memory, the second cache memory and the key value table, and configured to receive the encryption key from the key value table and the offset value from the first cache memory and supply the execution codes to the first cache memory after decrypting the execution codes according to the encryption key and the offset value, and receive the encryption key from the key value table and the address range from the second cache memory and supply the data to the second cache memory after decrypting the data according to the encryption key and the address range.

According to another aspect of the present invention there is provided a microprocessor, comprising: a cache memory configured to store a program stored in an encrypted form at an external memory, in a plaintext form at each cache line, in response to a request of a task; an instruction execution unit configured to execute the program in a plaintext form; a saving register configured to temporarily save an execution state of the program when an interruption occurs during an execution of the task; a hash calculation unit configured to attach a hash value to a content of the saving register and write the content of the saving register and the hash value into a prescribed line of the cache memory, when an execution state storing request is made; and an encryption processing unit configured to encrypt the execution state written into the cache line in units of cache lines by using a prescribed encryption key, and write the execution state back to the external memory.

According to another aspect of the present invention there is provided an encryption processing method, comprising: storing a task identifier of a currently executed task into a task ID register; reading a program stored in an encrypted form in which the program is encrypted in units of blocks at an external memory, in units of cache lines when a request for a task is made in order to execute the task; storing an identifier of a requested task into a prescribed region of a cache line; comparing the task identifier stored in each cache line with the task identifier stored in the task ID register; and decrypting a content read by the reading step when the task identifier stored in each cache line coincides with the task identifier stored in the task ID register.

According to another aspect of the present invention there is provided an encryption processing method, comprising: reading a program stored in an encrypted form at an external memory, by specifying an address; acquiring a start address of the program as an offset value; generating an encryption key by obtaining a relative address from a specified address and the offset value, and encrypting the relative address by using a prescribed key; and decrypting a content read by the reading step by using the encryption key generated by the generating step.

Other features and advantages of the present invention will become apparent from the following description taken in conjunction with the accompanying drawings.

BRIEF DESCRIPTION OF THE DRAWINGS

FIG. 3 is a diagram showing a block corresponding encryption key generation procedure in the multi-party application protection environment of FIG. 1.

FIG. 4 is a diagram showing configurations of an information arrangement descriptor and a distribution key and a memory map of a virtual address space used in one embodiment of the present invention.

FIG. 5 is a table showing examples of task control commands that can be used in one embodiment of the present invention.

FIG. 6 is a diagram showing exemplary task state transitions according to one embodiment of the present invention.

DETAILED DESCRIPTION OF THE INVENTION

Figure 1:
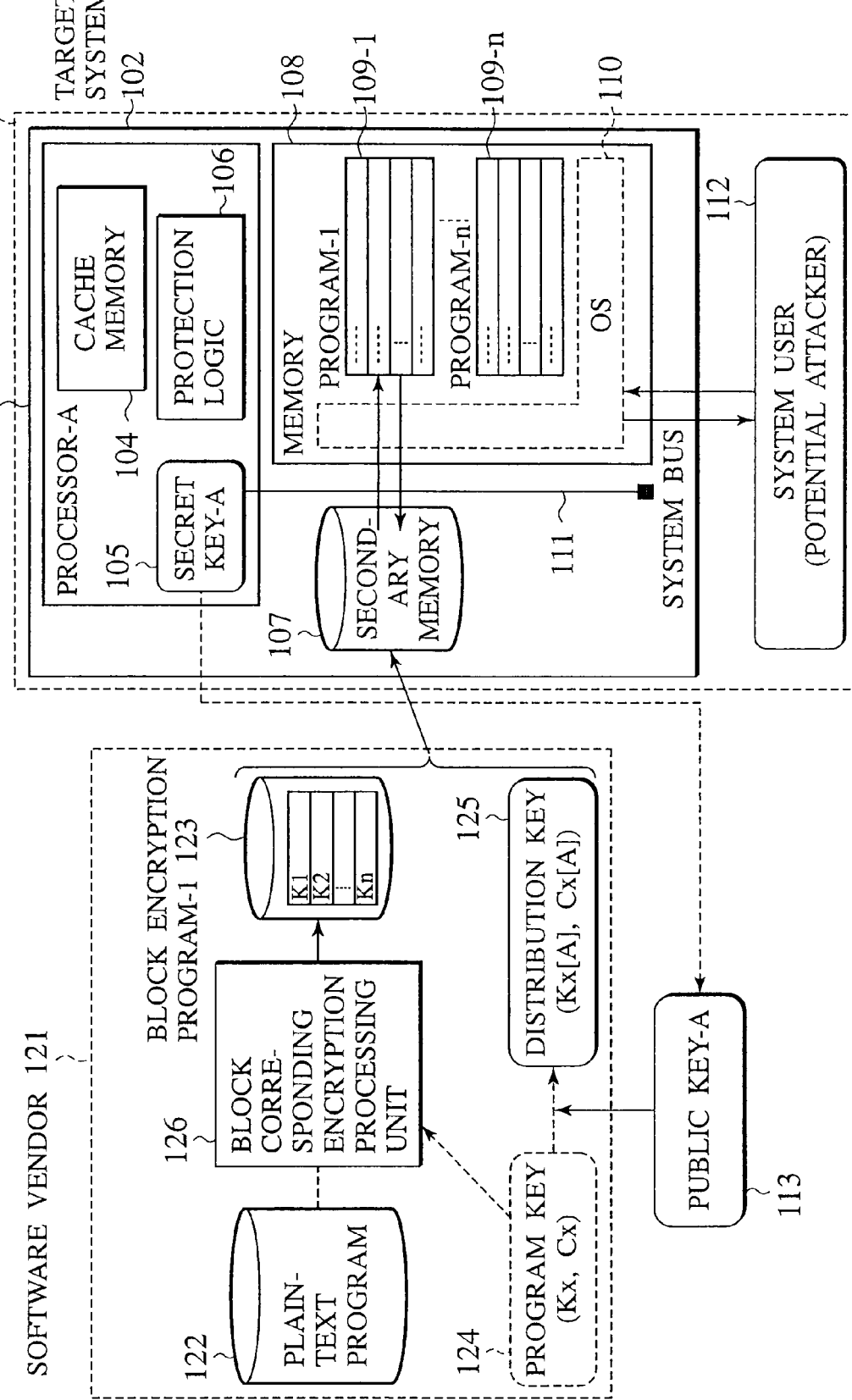
FIG. 1 is a block diagram showing a multi-party application protection environment using a microprocessor according to one embodiment of the present invention.

First, the major features of the present invention will be briefly described.

In order to solve the first problem, the task identifier actually stored in the cache line and the task identifier allocated by the OS are compared, and the access to the cache line is permitted only when they coincide, whereas the content of the cache line is discarded when they do not coincide.

In order to realize this, the microprocessor has a task state table for assigning an identifier to the task that can take a plurality of states and maintaining a state of the task in correspondence to the task identifier, a task register for maintaining the currently executed task identifier, an interface for reading in units of cache lines the program stored in the encrypted state by using a prescribed program key in the external memory when there is a request for the task, an encryption processing unit for generating a decryption key for each cache line according to the program key and decrypting the content read by the interface, a first cache memory formed by a plurality of cache lines having respective tags for maintaining a task identifier corresponding to the decryption key used in decrypting each cache line in the tag, and an access verification unit for comparing the task identifier maintained in the tag of the cache line and the value of the task register and discarding the content of the cache line when these values do not coincide.

In order to solve the second problem, it is made possible to carry out the decryption by using keys that are different for different blocks according to a small amount of secrets.

In order to realize this, the microprocessor is provided with the following.

(a) a processor core that issues a reading request by specifying an address of the external memory that stores a plurality of programs that are respectively encrypted according to the unique program keys;

(b) an interface for reading a data block of the specified address of the external memory in response to the reading request of the processor core;

(c) a task key table for maintaining the program key in correspondence to the task identifier assigned to each task which is a unit of the program execution control;

(d) an offset table for maintaining a top address at which the program is arranged as an offset value, for each task identifier;

(e) a key generation unit for calculating a relative address value from the address specified by the reading request and the offset value specified by the task identifier of the offset table, and generating a block corresponding key in which the relative address value is encrypted by using the program key;

(f) an encryption processing unit for decrypting the read out data block by using the block corresponding key; and (g) a cache memory into which the decrypted data block is read in units of cache lines.

Also, at a time of the task execution interruption, the physical addresses at which the program and the data are arranged are often changed by the system resource management (relocation), and in order to decrypt and normally execute the program encrypted in units of blocks, there is a need for the information to be arranged in a certain address space. For this reason, a virtual address is used in the case of calculating the relative address that is expressed by a difference between the target address and the program start address (offset address).

In this way, the block interchange can be prevented effectively, and the limited physical memory can be utilized efficiently.

In order to solve the third problem, the microprocessor is provided with the following.

(a) an interface for reading in units of cache lines the execution codes and the data of the program stored in the encrypted state at the external memory;

(b) a first cache having an offset table for maintaining the offset value that is the program start address, for maintaining the execution code in the plaintext state in each cache line;

(c) a second cache having an address range register that maintains an address range of the data, for maintaining the data in the plaintext state in each cache line;

(d) a key value table connected to the first and second caches through a common bus, for maintaining the encryption key used in encrypting the program;

(e) an encryption processing unit connected to the first and second caches and the key value table through a common bus, for receiving the encryption key and the offset value from the key value table and the first cache respectively, decrypting the execution code according to the encryption key and the offset value and supplying it to the first cache, receiving the encryption key and the address range from the key value table and the second cache respectively, and decrypting the data according to the encryption key and the address range and supplying it to the second cache.

With this configuration, it is possible to realize the microprocessor that has an efficient encryption processing structure that is shared among the caches.

Referring now to FIG. 1 to FIG. 17, one embodiment of the microprocessor according to the present invention will be described in detail.

FIG. 1 shows a multi-party application protection environment to which the present invention is to be applied.

A software vendor 121 produces a program 122, and distributes it to a microprocessor-A 103 provided inside a target system 102 of a system user 112. In order to protect the program to be distributed, the plaintext program 122 is encrypted.

More specifically, the program formed by execution codes and data such as initialization data is encrypted by using a program key selected by the software vendor 121, and the program key used for the encryption is encrypted by using a public key-A of the processor-A of the target system 102 to generate a distribution key.

At this point, the software vendor 121 divides the program and the initialization data into a plurality of blocks, and encrypts them by using a different key for each block. Note however that there is no need for the software vendor 121 to select as many keys as the number of blocks, and it suffices to select two things including a constant Cx as a basis for generating a plurality of keys, and a key Kx for encrypting the plurality of keys generated according to Cx. As will be described in detail below, a block encrypted program 123 is generated by the encryption using a different key for each block, according to these two constants. Then, Cx and Kx are encrypted by using the public key-A of the processor-A to produce a distribution key Kx[A], Cx[A].

Note that, in FIG. 1, only a single software vendor is shown for the sake of simplicity, but the multi-party environment is assumed here, so that the user 112 is assumed to purchase respective block encrypted programs from a plurality of vendors and store them into the system 102.

The distributed block encrypted program is stored into a secondary memory 107 such as a hard disk once along with the distribution key, and read into a region 109-1 secured in a memory 108 at a time of the execution. This reading into the memory is carried out by an OS 110 for managing resources of the system 102. The program itself and the distribution key may be stored into a single file or separate files. The memory 108 also has regions 109-n for other programs of the same vendor 121 or other programs of the other vendors, but their description will be omitted here for the sake of explanation.

The processor-A reads the distribution key 125, and decrypts the distribution key by using the secret key-A at a protection logic 106. The encrypted program arranged in the memory 108 is read into the cache memory 104 in units of blocks and decrypted in units of blocks by using the decrypted distribution key. At this point, a feature of the processor-A is that it has a capability for generating a block corresponding key in correspondence to each one of a plurality of encrypted blocks from a limited number of secrets, such as two constants Kx and Cx, for example, and carrying out the decryption in units of blocks.

Figure 2:
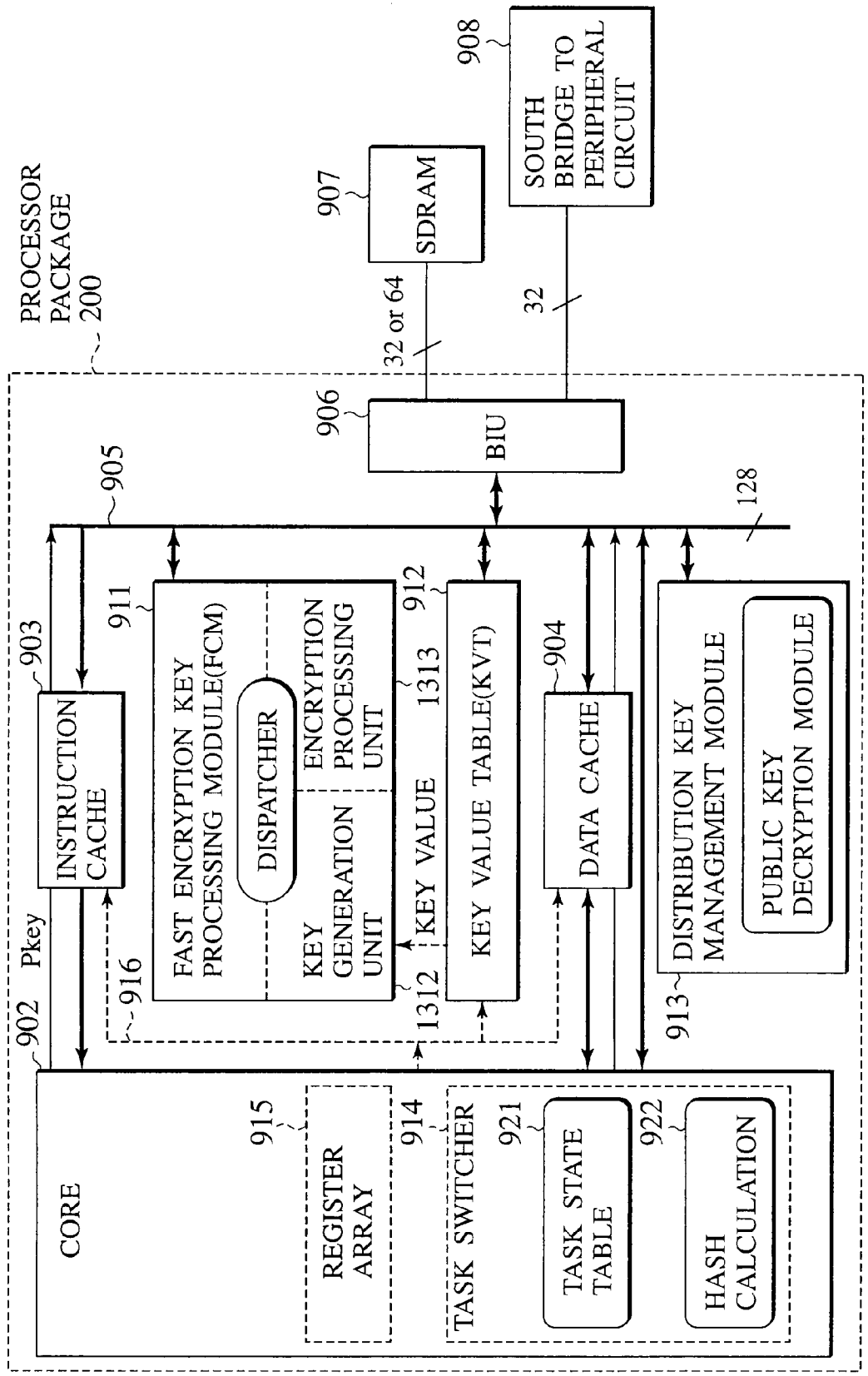
FIG. 2 is a block diagram showing an exemplary configuration of a microprocessor according to one embodiment of the present invention.

FIG. 2 shows a hardware configuration of the microprocessor-A shown in FIG. 1. The processor-A has a core 902, an instruction cache 903, a data cache 904, a fast encryption key processing module (FCM: Fast Ciphering Module) 911 to be shared by these caches, a key value table (KVT) 912, a distribution key management module 913, and a bus interface (BIU) 906, which are arranged within a processor package 200 and interconnected through an internal bus 905.

The core 902, the fast encryption key processing module 911, the key value table 912 and the distribution key management module 913 constitute the protection logic 106 of FIG. 1.

The core 902 has a register array 915 and a task switcher 914. The task switcher 914 executes the task switching, that is the saving and the recovery of the context when the interruption occurs. The context is generated in correspondence to the execution of the task, and managed in correspondence to the task. In order to realize this, the task switcher 914 internally has a task state table 921 and a hash calculation unit 922. The task state table 921 maintains the task state in correspondence to the task ID as will be described below. Also, although not shown in the figure, the core 902 issues a notice for change of the context in the register array, a distribution key setting command, etc.

The instruction cache 903 caches the execution codes of the program. In addition to an ordinary cache tag for identifying the address, a tag for identifying a protected task is also attached thereto, and the independence of the application is guaranteed among the internal data of the microprocessor. Note that, although not shown in FIG. 2, the instruction cache 903 internally has an offset table 1207 (see FIG. 9) for describing start addresses (offsets) of the program (execution codes) and the data, as will be described below.

The data cache 904 caches various informations related to the program such as initialization data, stack data, dynamic data, etc., of the program.

The fast (symmetric) encryption key processing module 911 has a key generation module 1312 and an encryption processing module 1313. The key generation module 1312 acquires a block key and a relative address value of a processing target block through the internal bus 905, and generates the encryption key corresponding to each block by the method to be described below. The encryption processing module 1313 executes the encryption/decryption processing of the corresponding block by using the generated encryption key for each block. The block encryption processing requires a plurality of clocks, so that a dispatcher for enabling the parallel processing of a plurality of modules is also included.

The key value table (KVT) 912 searches through the table according to the table ID information sent from the cache, and supplies the key value to the fast encryption key processing module 911.

The distribution key management module 913 sets up the decryption of the distribution key by using the public key and a decryption result table.

The microprocessor also has a task channel 916 as indicated by a dashed line in FIG. 2, which transmits information of the currently executed task and the context saved task from the core 902 to the other modules. Outside of the microprocessor package 200, a RAM 907 as an external memory and a so called south bridge 908 for connecting peripheral circuits are provided, and the data transfer and the buffering from/to the internal bus 905 to/from the external memory 907 and the south bridge 908 are carried out by the bus interface 905.

FIG. 3 shows a procedure for the encryption of the program in units of blocks. This processing is carried out by the block corresponding encryption processing unit 126 of the software vendor 121 of FIG. 1.

A program region 1001 of the plaintext application program developed by the software vendor is formed by a plurality of blocks (block-0 to block-$n$) in units of 128 bits (16 bytes). With respect to a whole of this region, two constants Kx and Cx are selected in advance.

First, a sum of the constant Cx and a relative top address of each block with respect to a top of the program is obtained. For example, the top byte of the first block-0 is "0", so that Cx+0 is calculated (S1002-0). The value Cx+0 is encrypted by using the secret key Kx, to generate a block corresponding key Kv0 (S1003-0). The plaintext block 1001-0 is encrypted by using this block corresponding key Kv0 (S1004-0), to generate an encrypted block 1005-0.

Similarly, the top byte of the second block-1 is "16" and the relative address with respect to the top of the program becomes "16", so that Cx+16 is calculated (S1002-1). The relative address of the (n+1)-th block n is "16n" so that Cx+16n is calculated (S1002-$n$). By encrypting these values by using Kx, the encryption keys Kv1 to Kvn of the corresponding blocks are generated (S1004-1 to S1004-$n$). The plaintext block-1 to block-$n$ are encrypted by the respective encryption keys, to generate the encrypted blocks 1005-1 to 1005-$n$.

In FIG. 3, the encryption processings S1003-0 to S1003-$n$ and S1004-0 to S1004-$n$ are shown to be independent from each other, but it is also possible to use a single encryption processing repeatedly by changing parameters, and it is also possible to realize them by software.

According to the encryption method shown in FIG. 3, the software vendor 121 can carry out the encryption processing without becoming conscious of the absolute address at which the program is arranged in the target system 102. The software vendor cannot guess the absolute address value, so that if the block corresponding key is to be generated according to the absolute address value, either it would become necessary to receive a notice of the absolute address at which the program is arranged in advance from the target system 102 and then create the encrypted program corresponding to the arranged address, or it would become necessary to distribute infinitely many encrypted programs corresponding to the possible arranged addresses. In either case, the distribution cost of the program itself would become considerably large.

In the method of FIG. 3, the secrets that must be distributed are only the key Kx and the constant Cx, and a plurality of the block corresponding encryption keys are generated by using the relative address of each block, so that the processing load on the software vendor side can be reduced and the economical requirement can be satisfied.

The blocks 1005-0 to 1005-$n$ so encrypted are transmitted to the target system 102 along with the distribution key Kx[A], Cx[A]. In the target system 102, once the secret information Kx, Cx and the relative address value of the block are given, it is possible to decrypt each block independently inside the microprocessor, without any dependence on the absolute address of the memory at which it is arranged or data of the other blocks.

This matches efficiently with the current OS which presupposes the re-location of the application programs and the current computer architecture which is characterized by the random accesses to the memory.

Also, even if the attacker makes the illegal interchanges of the blocks, the relative address value is different for each block so that the block encryption key Kv is also different, and therefore the operation as intended by the attacker will not be carried out.

Next, the operations on the target system 102 side will be described in detail.

Prior to the execution of the program, the OS 110 allocates regions of the memory 108 respectively to the execution codes, the initialization data (static data), and a work area (stack) of the application program received from the software vendor 121. At this stage, the program is still in the encrypted state. The start addresses of the allocated memory regions will be changed by the system state, i.e., the cooperatively operating other program modules and the arrangement of the shared memory, so that the OS that manages the system freely determines the addresses of the regions according to the situation (re-location). The OS 110 also determines the memory region for arranging the distribution key and reads the distribution key information therein.

The OS 110 describes the address information of these regions into a structure called information arrangement descriptor (IAD) on the memory.

FIG. 4 shows a memory map of a virtual address space of some task and a structure of the information arrangement descriptor 1111 and the distribution key information 1121. On the memory map, the program 1102, the initialization (static) data 1103, the work area (stack) 1104, the information arrangement descriptor region 1105, and the distribution key region 1106 are arranged.

The information arrangement descriptor 1111 contains a program region start address (program offset) 1112, a data region start address (static data offset) 1113, a data region end address (static data end) 1114, a work area start address (stack offset) 1115, a work area end address (stack limit) 1116, and a distribution key address start address (distribution key offset) 1117.

The distribution key 1121 contains a program key (Kx) 1122, a program secret constant (Cx) 1123, an initialization data key (Kdi) 1124, an initialization data secret constant (Cdi) 1125, an initialization data size (Sdi) 1126, a work area (stack) key (Kdw) 1127, a work area secret constant (Cdw) 1128. and a work area size (Sdw) 1129.

When the program arranged on the memory is read into the microprocessor 103, and decrypted and executed, the OS 110 issues various privileged commands (task control commands) for controlling the task state according to the information arrangement descriptor, so as to manage the task state.

FIG. 5 shows some examples of the task control commands, and FIG. 6 shows the state transition of the task. The task control commands include a registration of the task into an internal table (register), a starting of the task (start), a storing of the suspended task state (suspend), a resuming of the suspended task (continue), and an ending of the task, i.e., a deletion of the task secret information from the internal table (delete). Then, according to these task control commands, the task state makes transitions as shown in FIG. 6, from a NULL state 201 to an INIT state 202, a RUN state 203, a STOPPED state 204, a SUSPEND state 205, etc.

In the following, the operations for executing the task, especially the registration of the task, the execution of the task, the interruption of the task, and the ending of the task will be described in detail.

<Registration of the Task>

1. Registration Processing Flow:

First, in order to register the task, the OS 110 issues a "register" command which is a privileged command, by using the ID of the task to be registered and a top address of the information arrangement descriptor of that program as parameters. By the issuance of the "register" command, the distribution key 1121 for this program is decrypted, and the key to be used for decrypting each memory block and the relative address information are registered into various tables (to be described below) inside the microprocessor in relation to the task ID.

Figure 7:
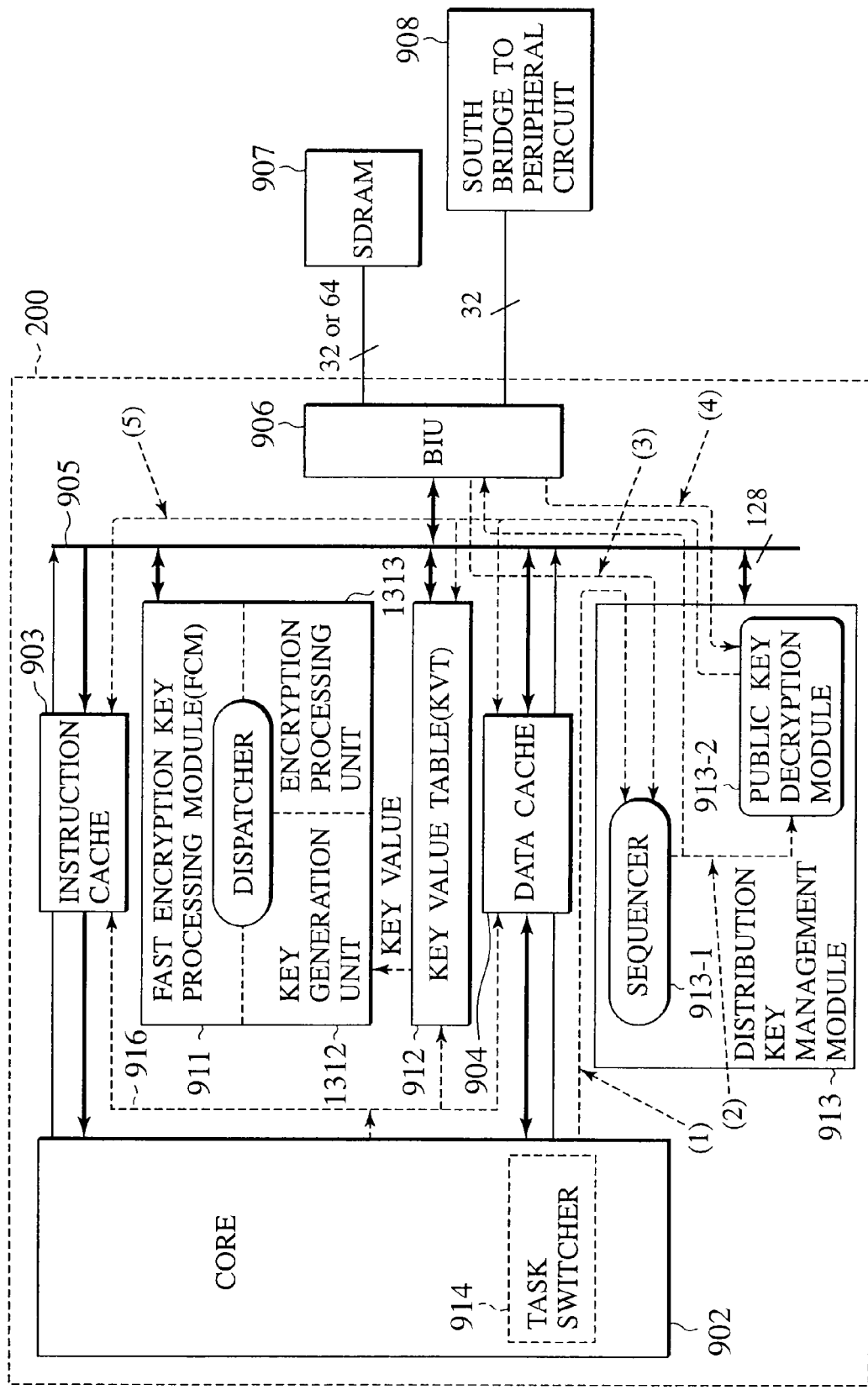
FIG. 7 is a block diagram showing task registration operations on the microprocessor of FIG. 2.
Figure 8:
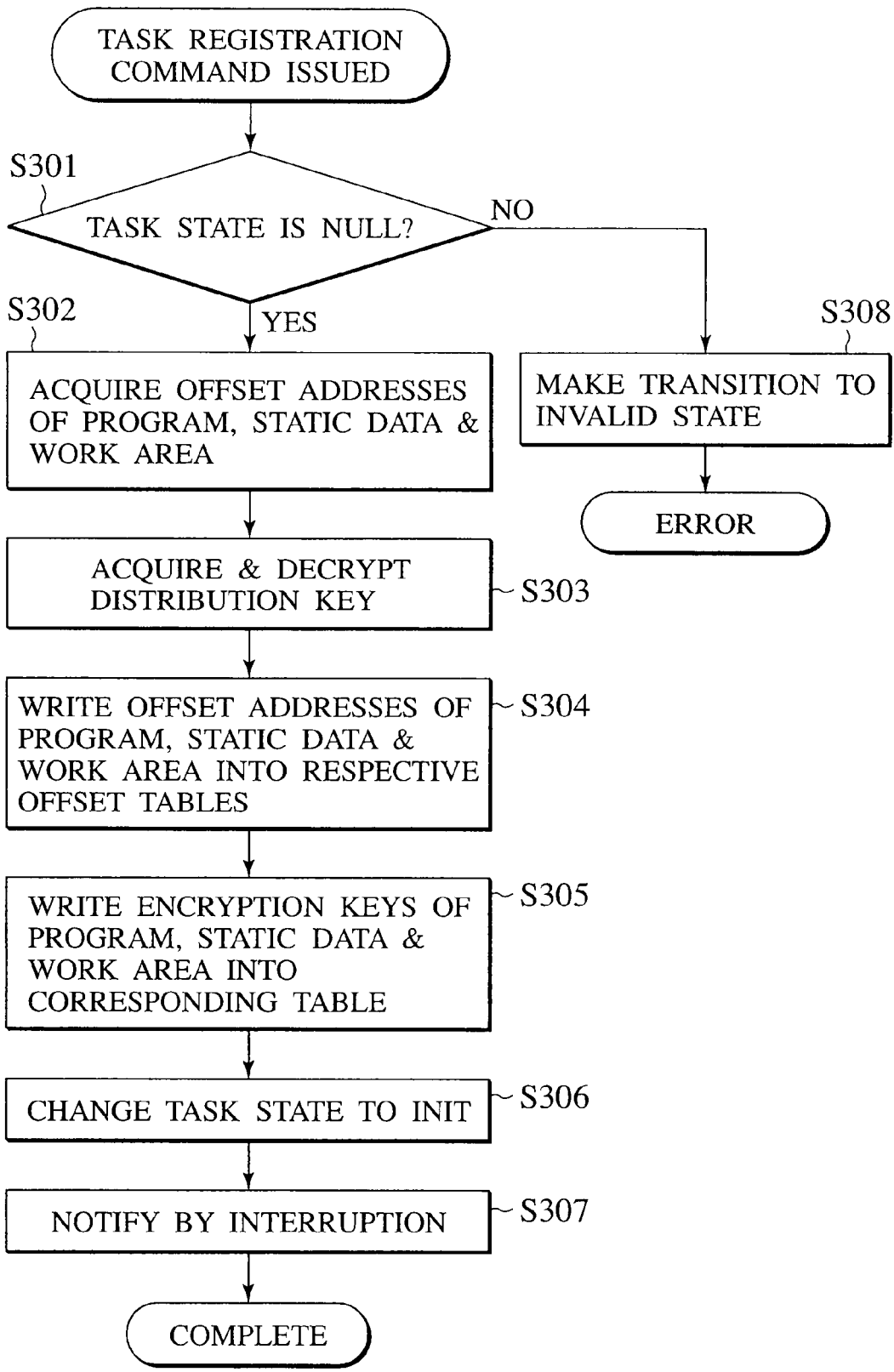
FIG. 8 is a flow chart showing a task registration processing procedure in the microprocessor of FIG. 2.

FIG. 7 shows an outline of the task registration operation on the microprocessor (hardware) 103, and FIG. 8 shows a processing flow of the "register" command.

When the "register" command is issued by using the address of the information arrangement descriptor (IAD) 1111 and the task ID #1 as parameters, the task switcher 914 inside the core 902 checks the task state (S301). If the task state is not NULL (S301 NO), the task state is set to be INVALID and it is processed as an error (S308). If the task state is NULL (S301 YES), the core 902 writes a registration request containing the information arrangement descriptor address and the task ID into a sequencer 913-1 of the distribution key management module 913, as indicated by a dashed line (1) in FIG. 7.

The sequencer 913-1 transmits a memory reading request with respect to the information arrangement descriptor region to the BIU 906 as indicated by a dashed line (2) in FIG. 7, and the BIU 906 supplies the information arrangement descriptor 1111 to the sequencer 913-1 as indicated by a dashed line (3) in FIG. 7. The sequencer 913-1 analyzes this information arrangement descriptor to acquire the offset addresses and ranges corresponding to the program, the initialization data and the work area, and the distribution key offset address 1117 (S302).

Next, the sequencer 913-1 transmits a reading request with respect to the distribution key address to the BIU 906. The BIU 906 supplies the content of the distribution key to the public key decryption module 91302 as indicated by a dashed line (4) in FIG. 7. The public key decryption module 913-2 decrypts the distribution key 1121 (see FIG. 4) to acquire the program secret constant (Cx), the initialization data secret constant, and the work area secret constant (S303).

Next, the public key decryption module 913-2 writes the offset addresses of the program, the initialization data, and the work area acquired at S302 into an offset table (see FIG. 9) of the instruction cache 903 as indicated by a dashed line (5) in FIG. 7.

Similarly, the public key decryption module 913-2 writes the encryption keys (secret constants) of the program, the initialization data and the work area acquired at S303 into the key value table 912 (S305). In this way, the tables are set up and the registration of the task is completed.

When the registration of the task is completed, the task state makes a transition from NULL to INIT (S306), and this state transition is notified to the core 902 by the interruption (S307), so that the OS can ascertain that the preparation for the execution of the task is finished.

2. Set Up of Tables:

Before describing the set up of various tables inside the microprocessor, the configuration of the instruction cache 903, the fast encryption key processing module (FCM) 911, the key value table (KVT) 912, and the data cache 904 that constitute the microprocessor will be described with references to FIG. 9 to FIG. 11.

Figure 9:
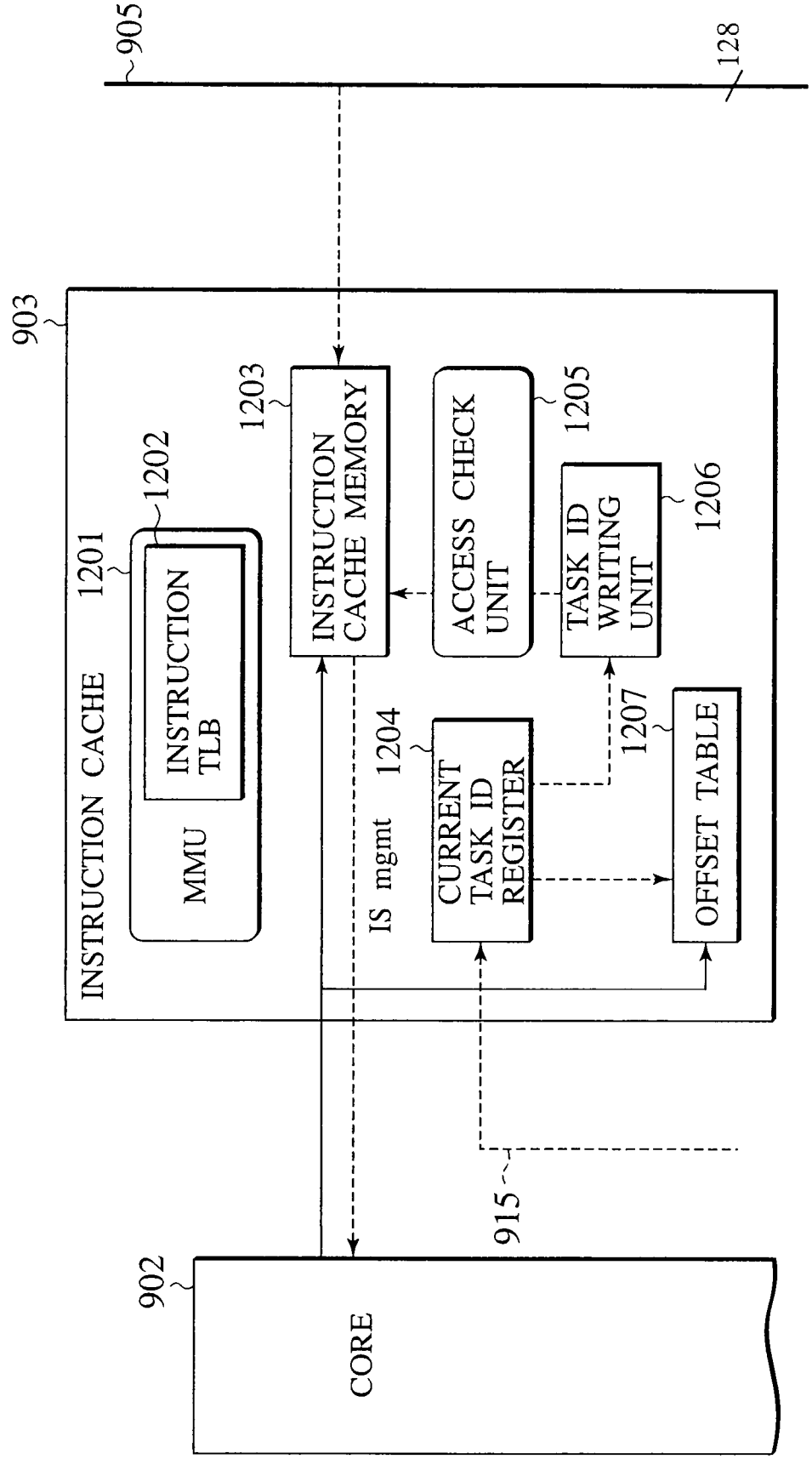
FIG. 9 is a block diagram showing a configuration of an instruction cache in the microprocessor of FIG. 2.

FIG. 9 shows a detail of the instruction cache 903. The instruction cache 903 includes an instruction management unit (MMU) 1201 having an instruction TLB (Translation Lookaside Buffer) 1202, an instruction cache memory 1203, a current task ID register 1204, a cache access check unit 1205, a task ID writing unit 1206, and an offset table 1207.

The cache memory 1203 is formed by a plurality of cache lines in a prescribed size, and each cache line has a tag for maintaining the task ID of the task to be executed by that cache line (block). The cache access check unit 1205 compares the task ID maintained in the tag and the current task ID register value, and permits access only when they coincide. The content of that cache line is discarded when they do not coincide.

Figure 10:
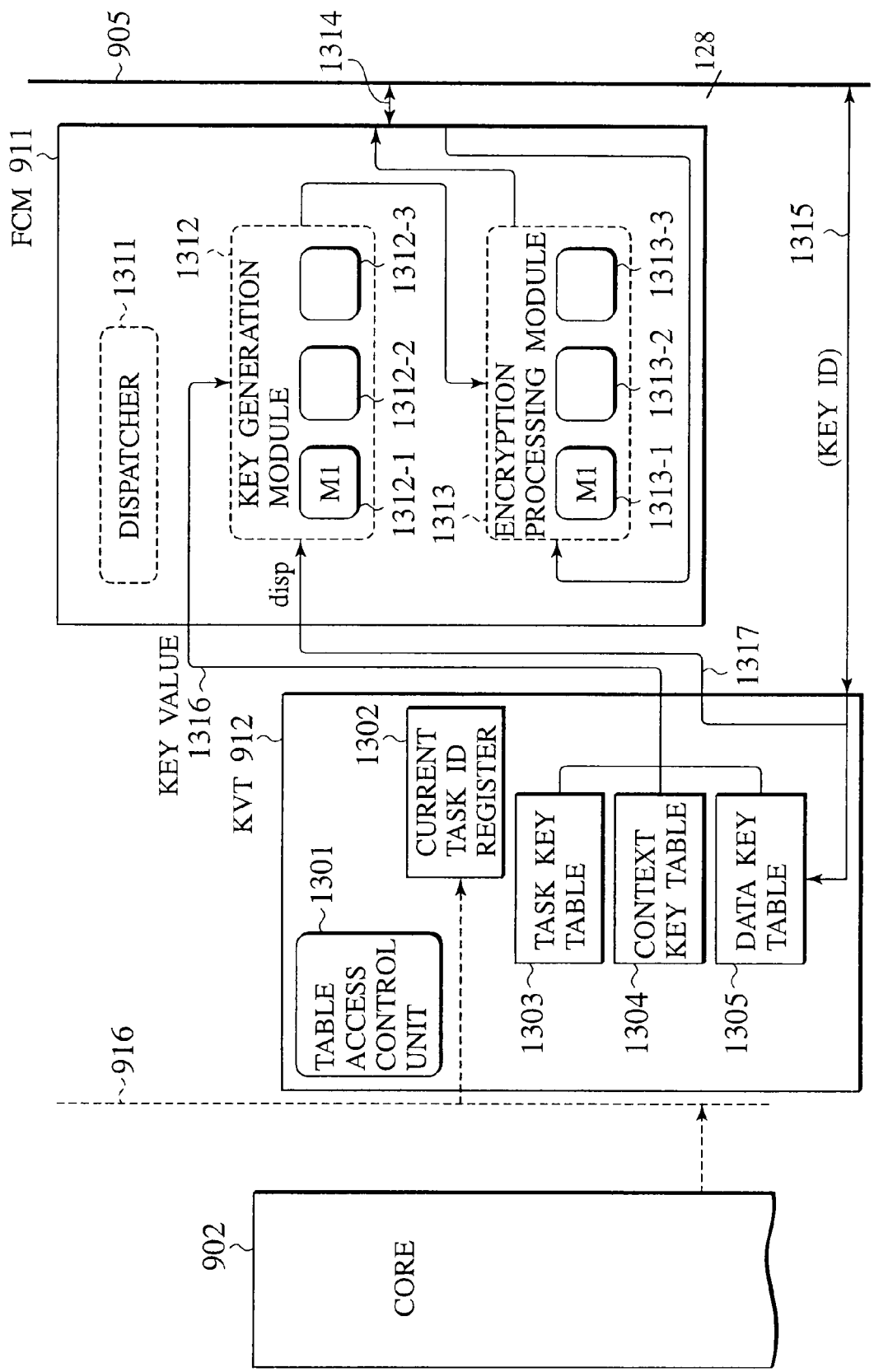
FIG. 10 is a block diagram showing configurations of a key value table and a fast encryption key processing module in the microprocessor of FIG. 2.

FIG. 10 shows details of the key value table (KVT) 912 and the fast encryption key processing module (FCM) 911. The KVT 912 includes a table access control unit 1301, a current task ID register 1302, a task key (or program key) table 1303, a context key table 1304, and a data key table 1305. Although not shown in FIG. 10, the data key table 1305 contains four tables (table-0 to table-3). The KVT 912 is connected to the internal bus 905 through a bus 1315.

The fast encryption key processing module (FCM) 911 includes a dispatcher 1311, a key generation module 1312, and an encryption processing module 1312. The key generation module 1312 has three parts 1312-1 to 1312-3 in parallel as key generation units, and the encryption processing module 1313 has three parts 1313-1 to 1313-3 as encryption processing units. The dispatcher 1311 directs the processing to vacant parts of the key generation units and the encryption processing units, so as to enable the parallel processing. The FCM 911 is connected to the internal bus 905 through a bus 1314.

From the KVT 912 to the FCM 911, the encryption key is transferred through a bus 1316, and the relative address value is transferred through a bus 1317.

Figure 11:
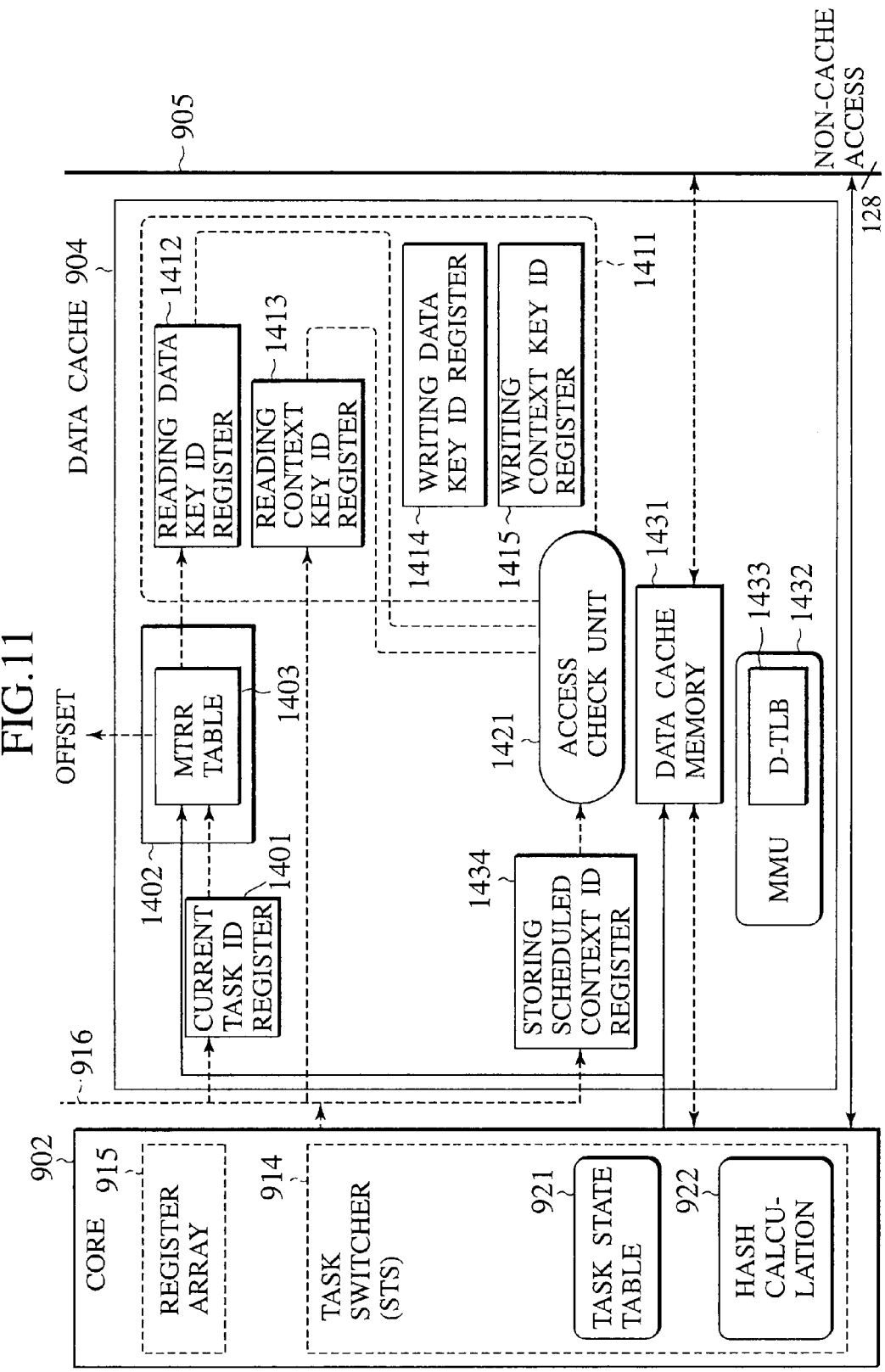
FIG. 11 is a block diagram showing a configuration of a data cache in the microprocessor of FIG. 2.

FIG. 11 shows a detail of the data cache 904. The data cache 904 includes a current task ID register 1401, an MTRR (Memory Type Range Register) table 1403 for maintaining the address range, an MTRR table management and comparison unit 1402 for managing the MTRR table and comparing the address range of the MTRR table with the target address, an encryption attribute output unit 1411, a data cache memory 1431, an MMU 1442 having a data TLB 1433, and a storing scheduled context identifier register 1434.

The encryption attribute output unit 1411 has a reading data key identifier register 1412, a reading context key identifier register 1413, a writing data key identifier register 1414, a writing context key identifier register 1415, and an access check unit 1421, for the purpose of checking the encryption attributes of the data and the context at a time of writing them back to the external memory. The MMU 1442 carries out the memory access by converting the virtual address outputted from the core 902 into the physical address, according to the prescribed conversion information.

The six types of the KVT 912, i.e., the program key table 1303, the context key table 1304, and the data key tables 1305 (0 to 3) are indexed by the task IDs, and capable of maintaining the two types of the secret information to be used for the key generation. The two types of the secret information to be used for the block decryption key generation, such as Kx 1122 and Cx 1123 for the program shown in FIG. 4, for example, are written into an entry of the task ID #1 in the program key table 1303 of the KVT 912.

On the other hand, the offset value 1112 of this program region is written into an entry of the task ID #1 in the offset table 1207 inside the instruction cache 903.

The MTRR table 1403 of the data cache 904 is identified by the task ID and an MTRR identifier which takes a value in a range of 0 to 3. Namely, the MTRR table 1403 has four MTRRs (address range registers) per one task, and the address range of the data region and the key value can be registered into each one of these. At a time of the task registration, the MTRRs with MTRR identifiers 0 and 1 corresponding to the initialization data and the work area (stack) are set up. Also, the contents of the MTRR with MTRR identifiers 2 and 3 are initialized to "0".

When one task refers to the memory, the target address and the address ranges of the MTRRs are compared, and the encryption attribute (i.e., the key) corresponding to the matching MTRR is used. The encryption key generation in the above described procedure is also applied to the data, by using the relative address value with a top address of the MTRR as an offset.

In order to prevent the occurrence of any contradiction among the table contents, all the operations with respect to this task are prohibited at the core 902 during a period in which these tables are rewritten.

When the rewriting of the tables is completed, the state of the entry corresponding to this task ID is written from NULL to INIT in the task state table 921 of the task switcher (STS) 914, and the completion of the registration is notified to the core 902 by the interruption.

Note that this embodiment is directed to the case of implementing these registration operations by hardware, but they may be implemented as software incorporated inside the processor as firmware. Note however that there is a need to take care to prevent the alteration of the firmware by a malicious system user.

<Execution of the Task>

1. Start of the Execution of the Task:

In order to execute the task, the OS executes the "start" command by using the task ID as a parameter with respect to the task in the INIT state. Then, the control is shifted to a top of the program region. If the "start" command is executed by specifying the task in the state other than the INIT state, it will be processed as an error and nothing will be executed.

Figure 12:
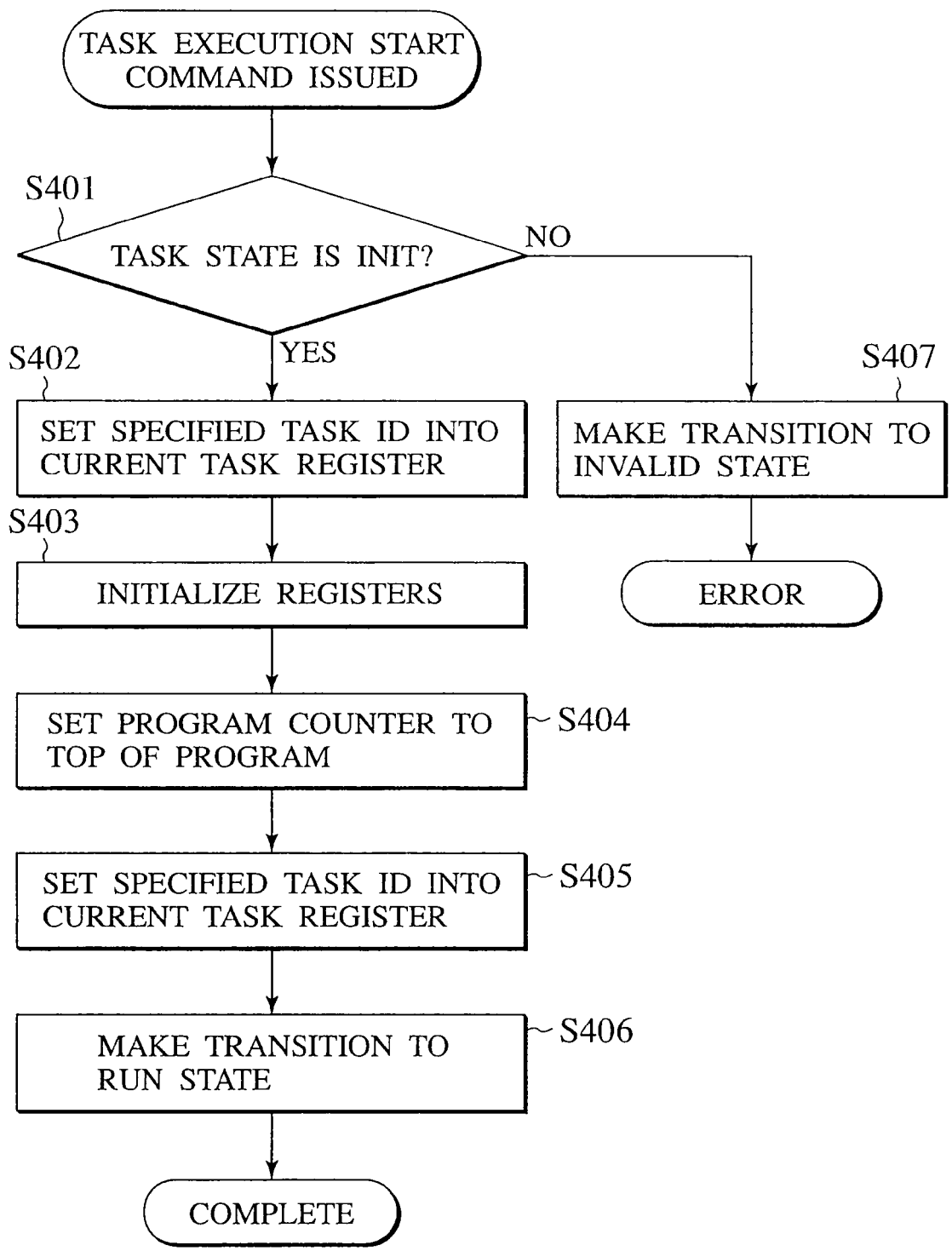
FIG. 12 is a flow chart showing a task execution start processing procedure in the microprocessor of FIG. 2.

FIG. 12 shows the processing flow of the task execution start command. When the "start" command is issued for one task by specifying its task ID, first, whether its task state is INIT or not, i.e., whether it is in a state where the preparation for the execution of the task is finished or not, is judged (S401). When the "start" command is issued by specifying the task identifier of the task in the state other than INIT (S401 NO), the state in the task state table 921 is set to be INVALID (S407) and it is processed as an error.

When the task is in the INIT state (S401 YES), the current task ID maintained by the core 902 is set to the new task (S402), and the register array 915 is initialized (S403). Also, a value of the program counter (not shown) is set to a top of the program region (S404).

Then, the new task ID is notified to the instruction cache 903, the data cache 904, and the key value table 912 through the task channel 916, and maintained at the respective current task ID registers 1204, 1401, and 1302 (S405). After that, the task state is rewritten from INIT to RUN in the task state table 921 of the core 902 (S406), and the execution is started.

In this embodiment, the program protected by being encrypted in units of blocks is executed, so that when the program in the external memory is read into the cache, the decryption of the program in units of blocks is carried out according to the program key registered in correspondence to the task ID, the plaintext obtained as the decryption result is read into the cache and executed. At this point, the offset is registered into the offset table 1297 inside the instruction cache 903 in accordance with the arranged memory address at a time of the task registration, and a difference between the memory address and the offset is used as the relative address value, so that the decryption can be carried out correctly no matter what address the OS arranges the program encrypted by the programmer.

Note that this embodiment is directed to the exemplary case of making a transition from the NULL state to the RUN state via the intermediate INIT state, but the purpose for doing this is to shorten the response impossible time which is relatively long in the public key algorithm processing, by executing the public key algorithm processing of the distribution key asynchronously. If the response impossible time is tolerable, the intermediate INIT state may be omitted (see commonly assigned co-pending U.S. patent application Ser. No. 10/059, 217 for the asynchronous public key algorithm processing).

2. Reading into the Instruction Cache:

Next, the processing for reading into the instruction cache 903 will be described with reference to the processing flow of FIG. 13.

The cache line read into the cache after the execution of the task is started is attached with the task ID tag of this task in addition to the ordinary tag for judging whether the memory address matches or not. Then, when there is an access to the cache line that is read into the cache, the access check unit 1205 of the instruction cache 903 judges whether the task ID tag attached to that line and the accessed current task ID coincide or not. If they do not coincide, it is handled as a cache miss even if the memory address tag is coinciding, and the information of this cache line will be read from the external memory again. Even if the content of the external memory corresponding to this line is read again by another task, it will be read by carrying out the decryption by using the key corresponding to the task ID of the newly accessed task. In other words, the result of the decryption by using the key different from the correct key will be executed, so that the normal processing will not be carried out.

Note that, in the following description, the calculation of the relative address is carried out according to the virtual address, but the judgement of the cache hit/miss is carried out with respect to the physical address. This is because if the virtual address is used for the judgement of the cache hit/miss, the phenomenon called alias in which the same memory block exists in plurality on the cache will occur. This phenomenon becomes particularly problematic when the same physical address region is to be shared by a plurality of tasks. For this reason, the cache hit/miss is judged by the physical address in this embodiment.

Figure 13:
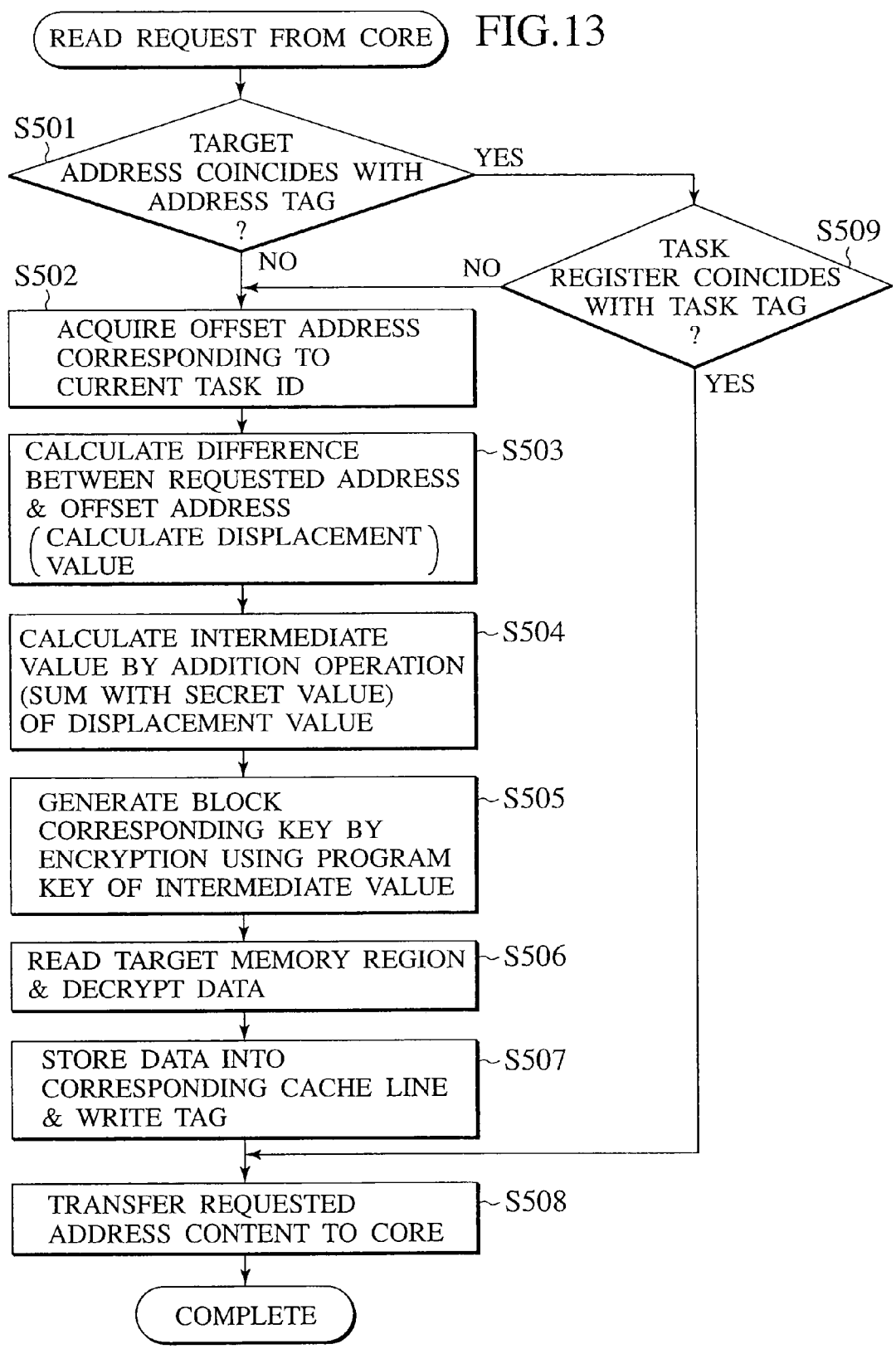
FIG. 13 is a flow chart showing a processing procedure for reading into an instruction cache in the microprocessor of FIG. 2.

FIG. 13 shows the processing flow for the reading into the instruction cache 903. In this flow, the operations of the instruction cache 903, the FCM 911 and the BIU 906 are collectively shown for the same of simplicity.

First, when there is a reading request from the core 902, the instruction cache 903 sends the reading request for the target address block to the BIU 906. The reading request contains information on a request ID, presence/absence of the protection, a target address range, and a request source ID.

Here, whether the target address and the address tag attached to the cache line that is read into the cache coincide or not is judged (S501). When the physical addresses do not coincide (S501 NO), it is regarded as a cache miss, and the acquisition of the offset address corresponding to the reading requested new task ID is started. The offset address is acquired from an entry corresponding to the current task ID in the offset table 1207 (S502).

Next, the relative address is calculated from the acquired offset value. The relative address is obtained by subtracting the offset value from the memory address (S503). Note that, when there is an access to the cache memory during the execution of the protected task, the instruction cache 903 carries out the calculation of the relative address in parallel to the access to the cache memory.

The instruction cache 903 sends the obtained relative address value and the task ID to the key value table (KVT) 912 through the internal bus 905. At this point, the request ID is attached. The KVT 912 acquires a value of the key corresponding to the task ID from the task key table 1303, and sends the key value and the offset value to the key generation module 1312 of the fast encryption key processing module (FCM) 911 through the channel 1316. At the same time the KVT 912 sends the offset value, the request ID and the request source ID to the encryption processing module 1313 of the FCM 911 through the channel 1317.

When the key value and the offset value are received from the KVT 912, the key generation module 1312 of the FCM 911 immediately starts the calculation of the key corresponding to that block. Namely, an intermediate value obtained by adding the relative address value to the secret constant Cx of the program is obtained (S504) and the obtained intermediate value is encrypted by using the secret key Kx of the program, to generate the block corresponding key that corresponds to the block of the program (S505).

This key calculation is the encryption processing, so that it requires the time of a plurality of cycles. In order to carry out the calculation efficiently, the key generation module 1312 is provided with a plurality of the key generation units 1312-1 to 1312-3, and the dispatcher 1311 directs the processing request to the vacant key generation unit. When one request is formed by a plurality of the encryption blocks, the steps S502 to S505 are repeated by incrementing the relative address value until the keys corresponding to all the encryption blocks are generated.

On the other hand, the BIU 906 buffers the result of reading from the external memory until it becomes the data in a size of the encryption block. When the unprotected non-encrypted data is requested from the beginning, the data are directly sent to the request source instruction cache, but in this embodiment, it is the request for the encrypted data, so that the result of the reading is sent to the FCM 911. The encryption processing module 1313 of the FCM 911 decrypts the data supplied from the BIU 906 by using the block encryption key generated by the key generation module 1312 (S506).

The decryption takes the time of a plurality of cycles, so that when the next encryption block that constitute the cache line arrives before the previous decryption processing is completed, another encryption processing unit is allocated and the processings are carried out in parallel. FIG. 10 only shows the encryption processing units 1313-1 to 1313-3, but by preparing the sufficient number of the encryption processing units, it becomes possible to carry out the decryption processing without causing the delay even when the data arrive at intervals shorter than the processing cycle of the encryption processing units.

The block for which the decryption is completed is immediately sent to the request source instruction cache 903 via the internal bus. The instruction cache 903 stores the data into this cache line, and when all the data that constitute the cache like are received, the instruction cache 903 writes an indication that the line is valid, an indication that the encryption is applied, and the executed task ID into the cache tag (S507).

When the cache line becomes valid, the core 902 reads the data from this cache line and resume the execution of the program (S508).

Next, the case where the target address and the address tag (physical address portion) of the cache line coincide at S501, that is, the case where the task B that has a task ID different from that of the task A that has been executed until then incidentally made an access to the same memory region and the cache line is hit, will be considered. The fact that the physical address of the cache is hit implies that the task B has the access right with respect to the memory at this address in a sense of the conventional resource management.

In this case, the access check unit 1205 of the instruction cache 903 further compares the value of the current task ID register 1204 and the task ID tag attached to this cache line (S509). When they do not coincide, that is, when the current task ID register 1204 is "B" but the task ID of the cache line tag is "A" and its encryption characteristic indicates that it is an encrypted line, for example (S509 NO), the cache is flashed and the steps S502 to S507 are repeated with respect to the task ID of the task B. Namely, the relative address is calculated from the offset address of the task B, and the result of decrypting the data of the external memory corresponding to the cache line address by using the program key of the task B is read into this cache line.

When the program keys of the task A and the task B coincide, these two tasks will just execute the same program even if they are read separately, but when the key that has been originally used in encrypting the data of the external memory is the program key of the task A and the key of the task B is different from that, the task B will execute a nonsensical program which is different from the intended program so that the intended attack cannot be made.

On the other hand, when the value of the current task ID register 1204 and the task ID tag of the cache line coincide (S509 YES), the content of the requested address is sent to the core 902 (S508).

In this way, when the same cache line is read again by another task during the execution of one task, the content of the external memory is read into the cache line by being encrypted by using a key different from the intended key. The program that executed the result of the decryption by using a key different from the intended key will not obviously carry out the normal operations.

This control cannot be overturned by the privilege of the OS. If the OS can freely operate the task key table 1303, it would be possible to acquire the secrets of the other program, but in the present invention, the cases where the OS can carry out the operations of the secret information and the task state management as represented by the registration of the program key are limited to the issuance of a series of the task control commands as shown in FIG. 5. Consequently, in the microprocessor of the present invention, the program or the data or the application cannot be correctly executed or read unless the key corresponding to each block of the program or the data of the application is known, even by the OS with the privileges regarding the resources.

With this mechanism, it is possible to provide the multi-party program protection environment that guarantees the independence of the application program.

Note that the above description stated that the quick decryption processing by a plurality of the encryption processing units 1313 is possible in relation to S506, but there is no need to provide a plurality of the encryption processing units if a single encryption processing unit has a sufficient throughput. For example, in the encryption processing formed by the repetition of the same type of operations as in DES, for example, it is known that the high throughput can be obtained by handling the processing by pipelines.

However, the implementation of such pipelines will require a large cost in terms of the hardware scale and the difficulty in the designing. Also, the encryption processing unit that is provided in a form of generally available IP requires highly sophisticated know-how and times for the designing, so that the designing of the encryption processing unit suitable for the required processing power at each occasion can be a significantly heavy load. When the various conditions are to be accounted, it is advantageous to operate a plurality of the existing encryption processing units in parallel as in this embodiment from a viewpoint of the flexibility of the designing. Also, it is effective in the reduction of the overall cost including the hardware designing cost.

3. Execution Processing at the Data Cache:

Next, the operation of the data cache will be described. The protection of the data such as the initialization data and the work area (stack) can be realized by applying the encryption protection using arbitrary encryption key to the data regions dynamically secured by the task. It is possible to define a plurality of the protected regions such as the initialization data region, the work area, the dynamic region, etc., and set respectively different keys. For example, in the case of the initialization data, the already encrypted data are present in the external memory, and the procedure for reading and decrypting it can be the same as in the case of the program basically.

In the case of the program (execution codes) described above, the encryption attribute is judged by comparing the current task ID and the task ID of the cache tag at the instruction cache 903, but in the case of the data, it is different in that the encryption attribute is judged by comparing the current task ID and the MTRR (address range register).

When there is a data access, the access attribute is judged at the MTRR table management and comparison unit 1402 of the data cache 904 shown in FIG. 11. More specifically, when the current task ID and the target address are entered into the MTRR table management and comparison unit 1402, the address range of the entries (0 to 3) of the MTRR table 1403 corresponding to the task ID and the target address are compared.

If there is only one MTRR entry that matches, its attribute is adopted unconditionally, and a set of the task ID and the MTRR entry ID becomes the encryption attribute of that memory access.

If the MTRR entries have overlapping address ranges so that the target address matches with the address ranges of a plurality of the MTRR entries, one MTRR is selected according to the priority order defined for each MTRR in advance, and it is used for the encryption attribute of that memory access.

The memory access attribute determined by the MTRR table management and comparison unit 1402 in this way is temporarily stored in the reading data key ID register 1412 of the encryption attribute output unit 1411 in the case of the data reading. Also, at the MTRR table management and comparison unit 1402, the relative address value is calculated from the top address of the MTRR entry that hit and the target address of the memory access.

These memory access attribute and relative address value are sent to the key value table (KVT) 912 through the internal bus 905 similarly as in the case of the access to the program memory.

The sequence by which the data cache requests the data reading to the BIU 906, the memory access attribute is sent to the KVT 912, the data is sent to the FCM 911 and decrypted there and returned to the data cache is the same as in the case of the instruction cache.

Finally, the memory access attribute and the relative address value are written into the cache tag, and the reading into the cache is completed.

Next, the problem related to the asynchronous writing into the data cache in the case having an address conversion mechanism and a mechanism to solve this problem provided in this embodiment will be described.

Figure 14:
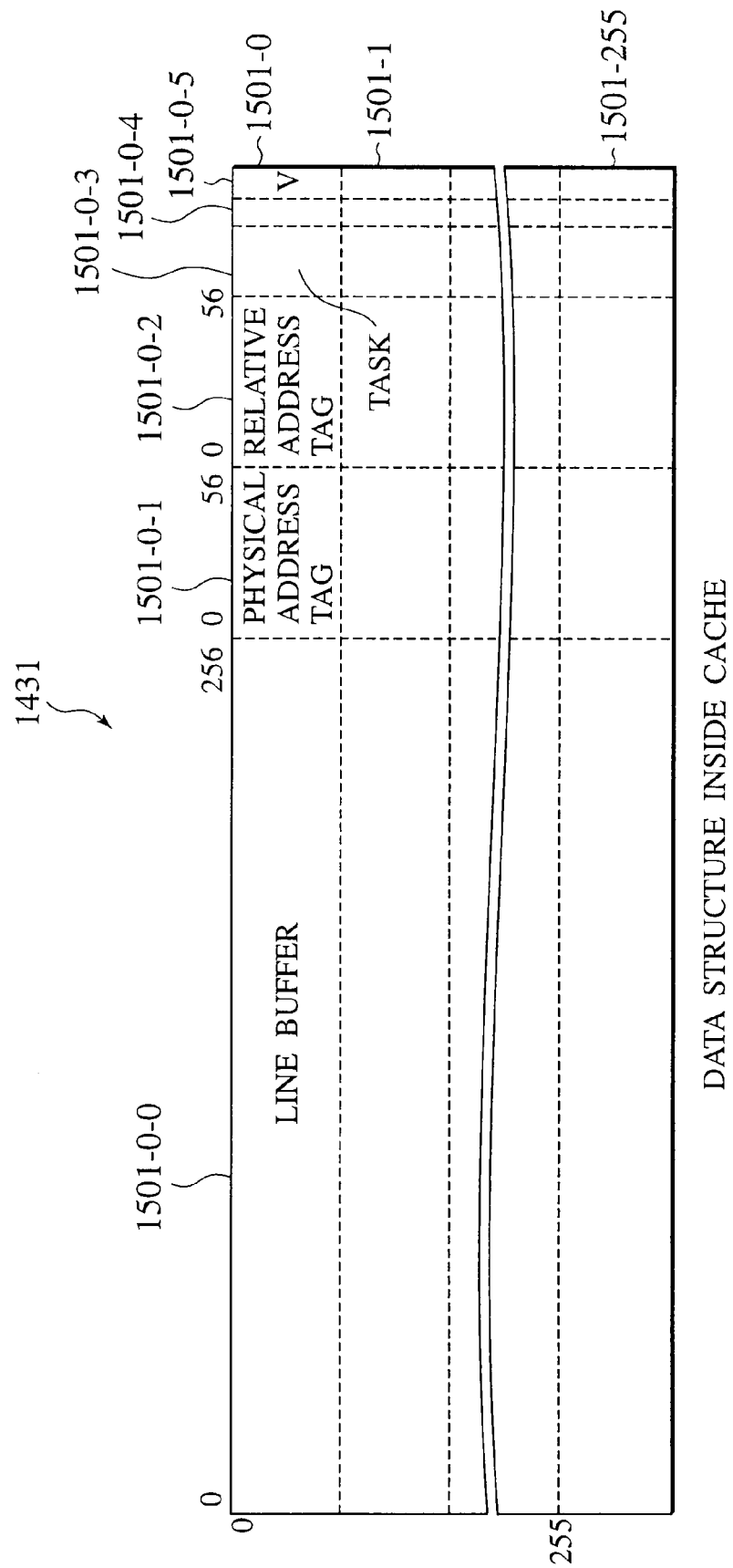
FIG. 14 is a diagram showing a data structure inside a data cache in the microprocessor of FIG. 2.

FIG. 14 shows a data structure of the data cache in this embodiment. The data cache memory 1431 is formed by 256 lines 1501-0 to 1501-255. Each line (line-0, for example) has a line buffer 1501-0-0 for storing the content of the external memory, a physical address tag 1501-0-1, a relative address value 1501-0-2, a task identifier 1501-0-3, an MTRR identifier 1501-0-4, and a flag region 1501-0-5.

The data cache 904 differs from the instruction cache 903 in that there can be cases where the data are temporarily saved into the external memory at a time of the data write back, i.e., at a time of the interruption, etc.

The cache line read by one task A is not necessarily written back to the external memory by being flashed during the execution of the task A. There is also a possibility of being flashed during the execution of another task B. In the case of the processor having the address conversion mechanism, it is possible to have different memory maps for different tasks so that the storing physical address of the cache line cannot be uniquely determined from the virtual address.

Conventionally, this problem is resolved by providing a physical address tag 1501-0-1 in the cache tag and giving the storing physical address information, such that the storing address of the cache line can be determined no matter which task is currently executed.

However, when the encryption using the block corresponding key of the present invention is applied to this mechanism, the following problem arises. As described above, the block corresponding key is generated from the relative address value which is a difference between the virtual address of the cache line and the offset value. In general, this relative address value cannot be generated from the physical address, so that the data encryption cannot be carried out at a time of the write back of the cache.

In this embodiment, this problem of the encryption at a time of the write back is solved by providing a tag 1501-0-2 for storing the relative address value in the cache tag of the data cache memory 1431, and storing the relative address value given at a time of securing this cache line. The writing of the tag is carried out at a time of determining the encryption attribute of this cache line.

As another method, the similar function can be realized by storing the virtual address in the cache tag. t a time of executing the asynchronous write back of the cache, the memory region information is stored at the MTRR table 1403, so that it suffices to calculate the relative address value by acquiring the offset information of the MTRR from the virtual address and the task identifier.

In the data cache 904, besides the initialization data and the work area determined by the distribution key, it is possible to add two data regions. These regions are specified by the MTRR (address range register) IDs 2 and 3.

The addition of the data region is carried out as the task issues a special command called "setkey". The data encryption key, the supplementary constant, the memory region and the MTRR ID are stored at a prescribed register of the processor, and the "setkey" command is issued. The Setkey" command is valid only for the data encryption attribute of the own task ID so that there is no need to specify the task ID explicitly in the command.

The "setkey" command is executed inside the core 902 by being decomposed into two steps of an access to the MTRR table 1403 of the data cache 904 and an access to the data key table 1305 of the key value table 912.

In the initial state of the task, the MTRR (address range register) IDs 2 and 3 are in an invalid state, i.e., a state in which the address range size is 0. In this state, any memory access cannot match the address range.

When the "setkey" command is issued, first the data cache line that matches with the task ID and the MTRR ID is flashed.

Next, the encryption key is written into an entry indexed by the task ID and the MTRR ID in the data key table 1305 of the key value table 912.

Next, the address range is written into an entry indexed by the specified task ID and the MTRR ID in the MTRR table 1403 of the data cache 904.

When the address range size of the MTRR exceeds 0, its encryption specification becomes valid. Thereafter, the writing of the additional data is the same as in the case of the initialization data.

In order to change the MTRR setting, i.e., to change the attribute of the data region, the "setkey" command is issued again. As described above, when the "setkey" command is issued, the lines on the cache that correspond to the MTRR ID are all flashed, and written out to the external memory. After that, the new setting is written into the data key table 1305 and the MTRR table 1403, and the read/write according to the new setting will be started.

The encrypted data that is once written back to the external memory and stored can be read out correctly only when the encryption key Kx, the supplementary constant Cx, and the offset address coincide with the previously used ones. Even if the encryption key and the supplementary constant coincide, if the offset address does not coincide, the correct value cannot be decrypted. This fact is important in the read/write of the disk data and the shared memory to be shared among the tasks. For this reason, when the "setkey" command is executed, the corresponding cache lines are flashed unconditionally.

On the contrary, even when one data region is copied to a region of another absolute memory address on the external memory, as long as the region specifying top address of the MTRR is set in correspondence to a moved address, the original data can be correctly read under the condition that the encryption key and the supplementary constant coincide.

In this way, in this embodiment, even in the data encryption, the individual encryption key scheme in units of blocks for the purpose of preventing the block interchange attack and the memory re-arrangement (re-location) can be made compatible without causing any contradiction.

<Suspension of the Task>

In the multi-task OS, the execution of the task is often suspended by the interruption. After the interruption, the interruption handler of the OS is executed, and according to the need, either the execution is switched to another task or the execution is returned to the original task without switching the task.

In the processor of this embodiment, when there is an interruption request from the interruption controller, the execution of the protected task is interrupted, and the execution of the interruption handler at the address specified by the interruption vector is started. Namely, the register values (context information) of the protected task used until then are saved into the register buffer (array) 915 of the core 902 by the interruption handler, and protected against the reading from the other tasks including the OS. By this interruption, the value of the task state table 921 makes a transition from RUN to STOPPED, as shown in the state transition of FIG. 6.

In the STOPPED state, the context of the suspended task occupies the register buffer 915 of the core 902, but when a SUSPEND command (task execution state storing command) is issued in this state, the content of the register buffer is stored into a memory region specified by the SUSPEND command, and the task state makes a transition to SUSPEND. The interruption handler cannot read out the content of the register buffer, but the interruption handler can store the content of the register buffer collectively into the memory.

In the case where the interruption processing time is long or the case where there is a task switching, the content of the register buffer is stored into the cache memory. There can also be a case where the stored context information is further written out to the external memory. In this case, the context information is written out to the external memory after it is encrypted by using a prescribed context key.

In order to resume the task in the SUSPEND (stored) state, a "resume" command is issued by specifying the task ID and the storing address of the context information, as shown in FIGS. 5 and 6.

In order to resume the task from the STOPPED state (a state in which the register values are not stored but merely saved), the "continue" command is issued. For example, in the case where the interruption processing is finished quickly and the task switching does not occur, or in the counter increment processing of the software timer, the register values used until then are not stored but merely saved into the register buffer array 915. In this case, the register values are recovered from the register buffer and the execution of the task before the interruption is resumed. The task state is returned from STOPPED to RUN.

Figure 15:
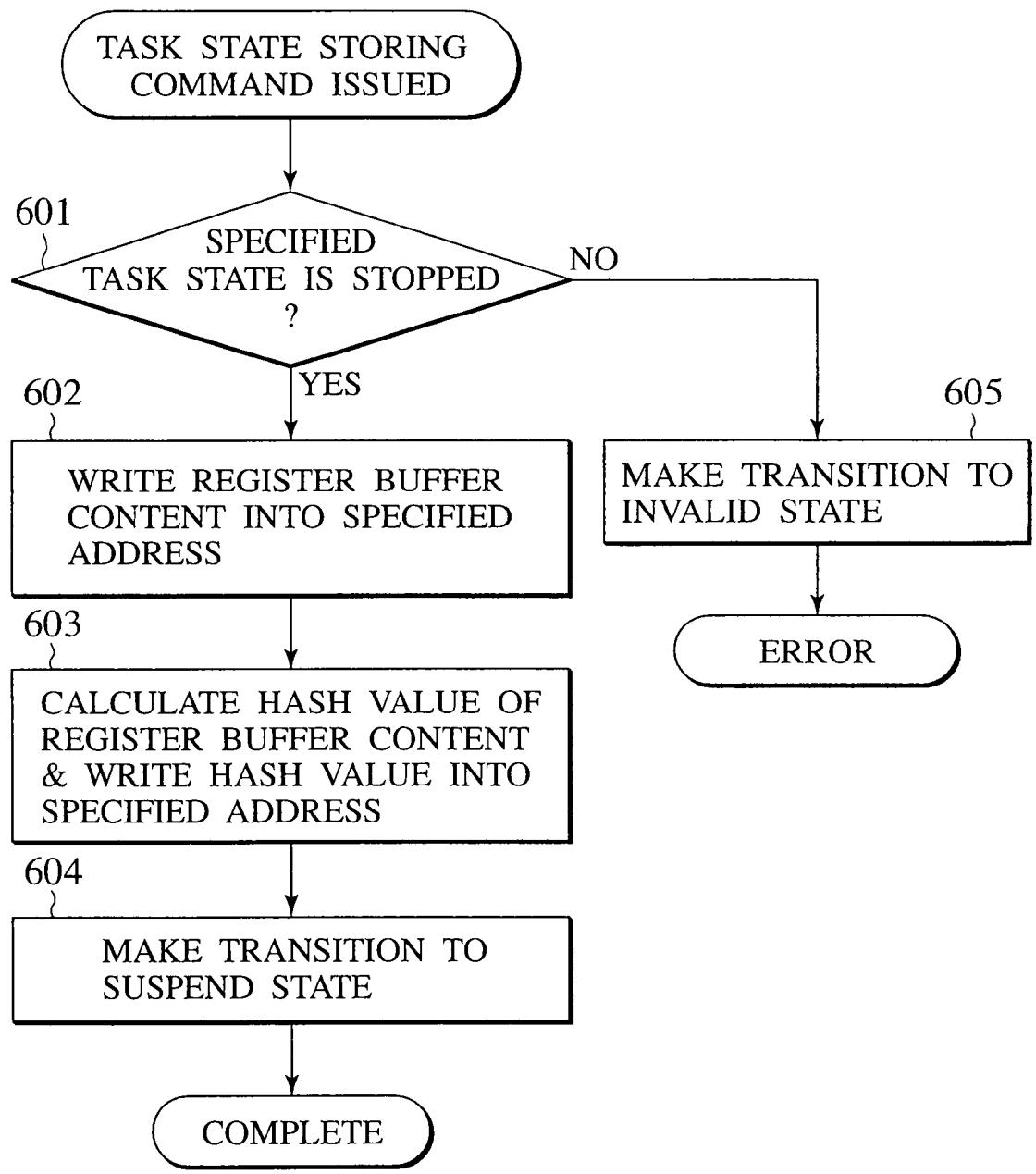
FIG. 15 is a flow chart showing a processing procedure for storing a task state in the microprocessor of FIG. 2.

FIG. 15 shows the processing flow when the "suspend (task state storing) command is issued.

First, when the "suspend" command is issued, the task state table 921 is referred and whether the specified task state is STOPPED or not is judged (S601). When it is not STOPPED (S601 NO), it implies that the register values used until then are not saved in the register buffer (array) 915 of the core 902, so that the "suspend" command issued in this state is invalidated, and the task state is set to be INVALID (S605).

When the specified task state is STOPPED (S601 YES), the content in the register buffer array 915 is written into the memory region of the address specified by the "suspend" command, and the storing is started (S602).

The storing is realized basically as the storing into the cache, and the ID of the task executed until then through the task channel 916 before the storing starts is maintained in the storing scheduled context identifier register 1434 of the data cache. Then, the cache line for writing the context information is secured on the data cache memory 1431, and the data transfer is started. Whenever the writing of the line is completed, the identifier indicating the context and the task ID are written into the tag of the cache line.

The storing of the context information completely overwrites the original memory content. The context information has a size that is an integer multiple of the cache line size, and its top address is always aligned by the cache line size, so that the normally required operation (write allocate) to read out the storing content before the writing becomes unnecessary.

Then, the hash value of the entire content of the register buffer is calculated at the hash calculation unit 922 of the core 902, and the hash value is attached to the end of the register information on the memory along with the task ID (S603). In the case where many lines are involved, the task switcher (STS) 914 of the core 902 calculates the hash while writing the information of the register buffer array 915 sequentially into the cache lines. When the task ID and the hash value are written at the end of the context region and the tag is attached, the execution of the "suspend" command is completed, and the task state makes a transition to SUSPEND (S604).

The stored context information is written out to the external memory 108 asynchronously with respect to the execution of the task. At a time of writing out to the external memory, the handling of the context information differs from that of the other information in two points. One is the handling of the relative address value, and the other is a difference in the reading processing.

The context information is formed by a plurality of blocks, but the same value is used as the relative address value, and the relative address value is given by a predetermined constant. This is because the context information has the hash value attached thereto, so that it is already resistant against the block interchange. When the cache line in which the context information is stored is to be flashed, the extracted encryption attribute is temporarily stored into the writing context key ID register 1415. The subsequent processing is the same as in the case of writing out the data cache.

Figure 16:
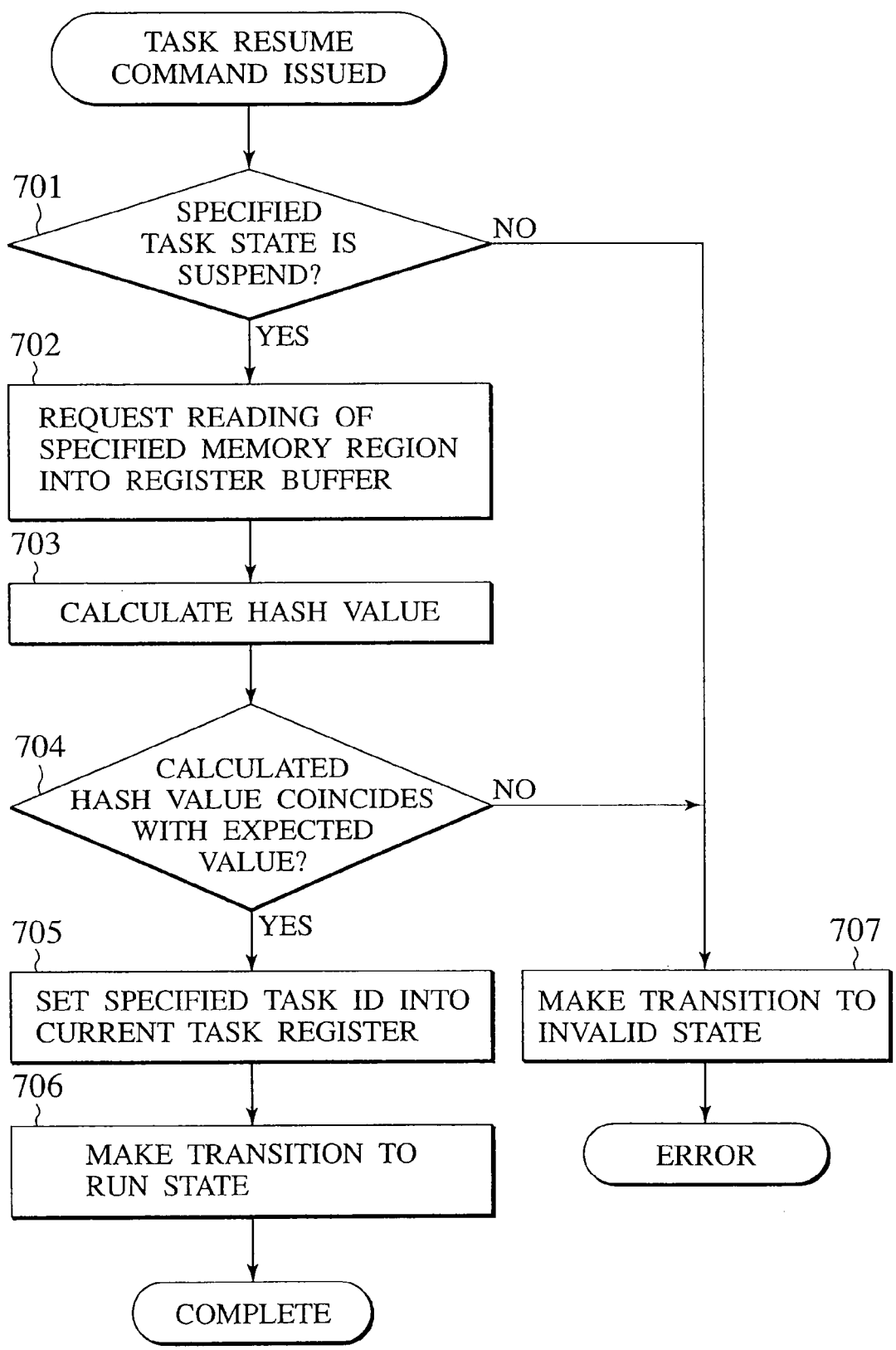
FIG. 16 is a flow chart showing a processing procedure for resuming an interrupted task in the microprocessor of FIG. 2.

FIG. 16 shows the processing flow at a time of resuming the task from the stored context information.

First, when the "resume" command using the task ID and the storing memory address as parameters is issued in order to resume the execution of the task by reading the stored context information, whether the specified task state is SUSPEND or not is judged (S701). When it is not in the SUSPEND state (S701 NO), the context information is not stored, so that the task state is set to be INVALID (S707). In other words, the "resume" command is invalid when the task state is a state other than SUSPEND.

When it is in the SUSPEND state (S701 YES), the address and the task ID are sent to the data cache 904 through the address line and the task channel respectively. When the address of the cache hits and the tag indicates the context and the task ID coincides, the data on the cache memory 1431 are transferred to the register buffer and the task resuming processing is started (S702).

In parallel to the data transfer to the register buffer, the hash calculation is carried out (S703). Whether the calculated hash value coincides with the expected value or not is judged (S704), and if they do not coincide, the resuming processing is interrupted, and the task state is set to be INVALID (S707).

When the hash value coincides (S704 YES), the ID of the specified task is set to the current task register (S705), the task state makes a transition to RUN, and the execution is resumed (S706).

Although not described in the processing flow of FIG. 16, the case where the cache does not hit for the region of the context information specified by the "resume" command is the case where the stored data are written out to the external memory. In this case, the data reading from the external memory is started. Namely, the task ID maintained at the task ID register 1401 and the reading request for the memory corresponding to the address specified by the "resume" command are sent from the data cache 904 to the BIU 906. Then, the task ID and the encryption attribute indicating the context are sent to the key value table 912, and the key for the decryption is generated at the FCM 911. The context information of the task stored at some point is entirely encrypted by using the same key, so that the key generation in units of blocks is not carried out here.

The blocks for which the decryption is completed are sequentially sent to the data cache 904, and the task switcher (STS) 914 reads their contents into the register buffer array 915. The subsequent processing is the same as in the case of the cache hit.

<Ending of the Task>

In order to end the task and re-utilize the allocated task ID and the various tables inside the processor for the sake of another new task, the "delete" command is issued by specifying the task ID. In this embodiment, the task ID of the task that is registered once cannot be used for the sake of a new task while the system is operating, in order to prevent the illegal peeping of the content of the task until then.

Figure 17:
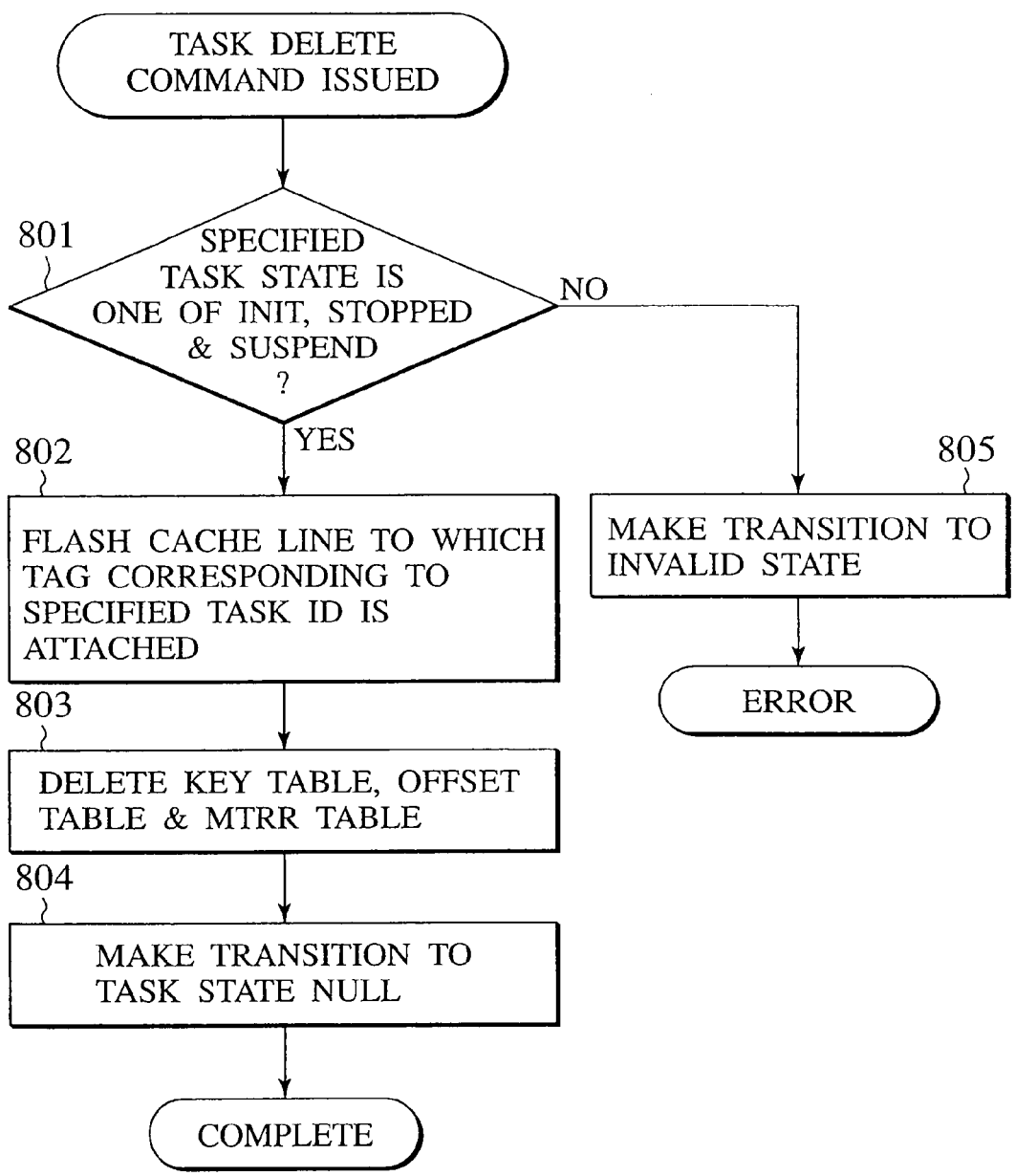
FIG. 17 is a flow chart showing a task ending (deleting) processing procedure in the microprocessor of FIG. 2.
Figure 18:
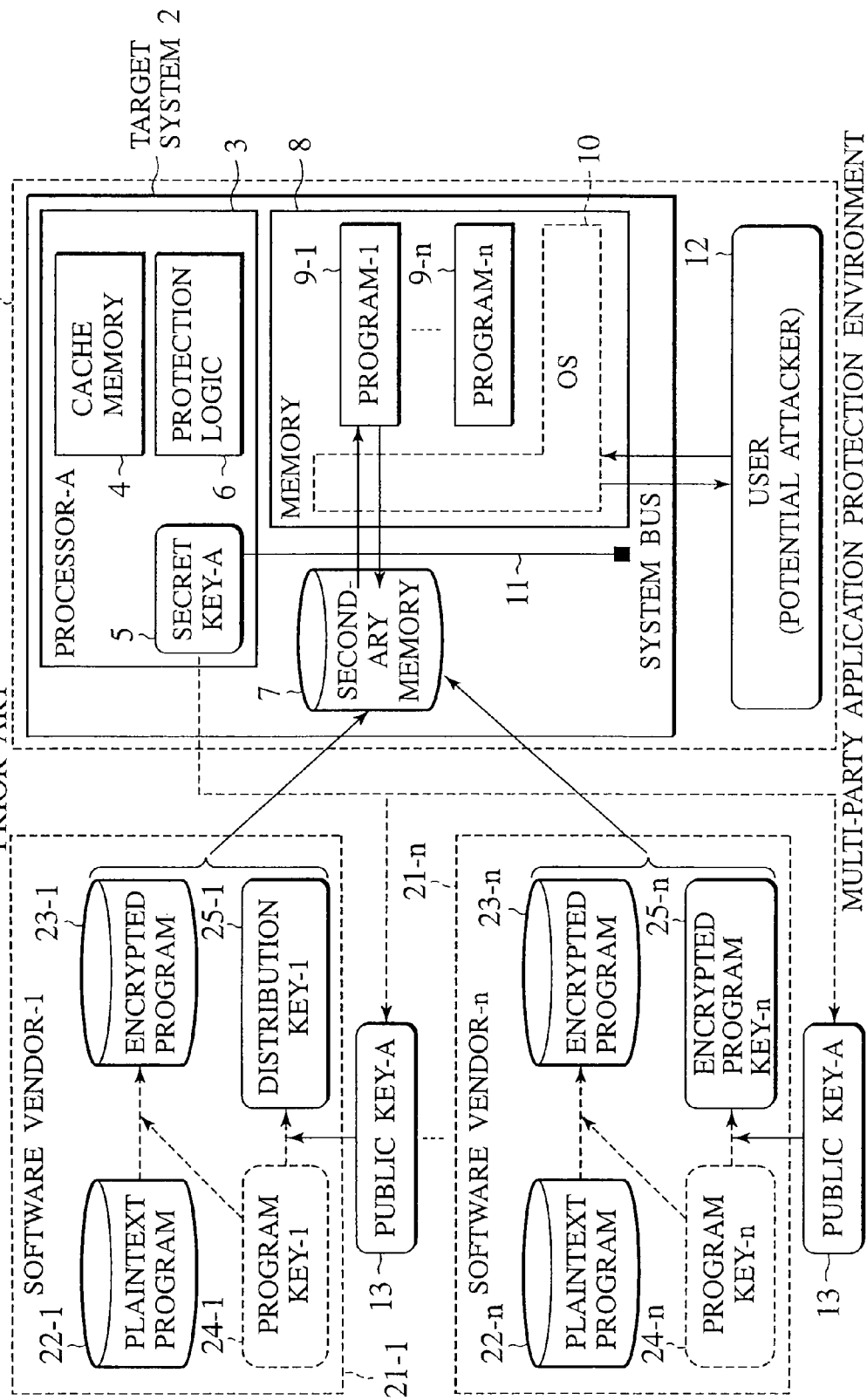
FIG. 18 is a block diagram showing a conventional multi-party application protection environment.

FIG. 17 shows the processing flow in the case of the task deletion.

First, when the "delete" command is issued with respect to the task, whether the state of the specified task is any one of INIT, STOPPED, and SUSPEND or not is judged (S801). When the task state is not in any one of the above states (that is, when the task state is RUN or NULL), the task state is set to be INVALID (S805) and it is processed as an error.

When the task state is in one of the above states (S801 YES), the cache lines with the tag corresponding to the specified task are flashed (S802).

As a result, the corresponding key tables 1303 to 1305, the offset table 1207 of the instruction cache, and the MTRR table 1403 of the data cache are also cleared (S803).

When these operations are completed, the task state is set to be NULL (S804).

The "delete" command is to be issued by the OS rather than by the task itself, and the "delete" command can be issued only with respect to the task in a state other than RUN and NULL.

When the task is deleted and the task state becomes the NULL state, it is possible to execute a new task by registering the distribution key by using the "register" command again.

As described, according to the present invention, the program is encrypted/decrypted in units of blocks by a simple method according to a small number of secrets, so that it becomes possible to prevent the block interchange attack, and it becomes possible to reduce the resource management and processing loads on both the software vendor side and the microprocessor side.

Also, according to the present invention, the relative address based on the virtual memory space is used for the block corresponding encryption, so that it becomes possible to deal with the problem of the re-location efficiently.

Also, according to the present invention, the key value table and the fast encryption key processing module are shared among the caches, so that it becomes possible to reduce the hardware cost.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A microprocessor, comprising:
an interface configured to read execution codes and data of a program stored in an encrypted form at an external memory, in units of cache lines;
a first cache memory having an offset table for storing an offset value which is a start address of the program, and configured to store the execution codes in units of cache lines;
a second cache memory having an address range register for storing an address range of the data, and configured to store the data in units of cache lines;
a key value table connected to the first cache memory and the second cache memory through a common bus, and configured to store an encryption key used in encrypting the program; and
an encryption processing unit connected to the first cache memory, the second cache memory and the key value table through the common bus, and configured to receive the encryption key from the key value table and the offset value from the first cache memory and supply the execution codes to the first cache memory after decrypting the execution codes according to the encryption key and the offset value, and receive the encryption key from the key value table and the address range from the second cache memory and supply the data to the second cache memory after decrypting the data according to the encryption key and the address range.

2. The microprocessor of claim 1, wherein the encryption processing unit further comprises:
a key generation module formed by a plurality of parallel key generation units, and configured to generate a block encryption key for decrypting each cache line according to the encryption key from the key value table, the offset value from the first cache memory, and the address range from the second cache memory;

an encryption processing module formed by a plurality of parallel encryption processing units, and configured to decrypt each cache line according to the block encryption key; and a dispatcher for directing processings sequentially to vacant units among the key generation units and the encryption processing units.

3. A microprocessor, comprising:

a cache memory configured to store a program stored in an encrypted form at an external memory, in a plaintext form at each cache line, in response to a request of a task;

an instruction execution unit configured to execute the program in a plaintext form;

a saving register arranged in the instruction execution unit and configured to temporarily save an execution state of the program when an interruption occurs during an execution of the task;

a hash calculation unit arranged in the instruction execution unit and configured to attach a hash value to a content of the saving register including the execution state of the program and write the content of the saving register and the hash value into a prescribed line of the cache memory, when an execution state storing request is made; and an encryption processing unit configured to encrypt the execution state written into the cache line in units of cache lines by using a prescribed encryption key, and write the execution state back to the external memory.

4. The microprocessor of claim 3, wherein each cache line of the cache memory has a flag indicating that the execution state is stored in each cache line.

5. The microprocessor of claim 3, wherein the encryption processing unit reads the execution state in an encrypted form into the cache memory, decrypts the execution state by using the encryption key in units of cache lines, and supplies the execution state to the saving register, when an execution state recovery request is made; and the hash calculation unit verifies the hash value, and permits a recovery of the execution state only when a verification succeeds.

6. The microprocessor according to claim 1, herein the second cache memory is configured to store in units of cache lines:

a physical address for storing a physical address value to which the data is written back in an external memory;

a relative address tag for storing a relative address value from an offset address value of the data or a virtual address value, which is assigned to the data in a virtual memory; and a task identifier for identifying a task, wherein when the second cache memory is flashed in units of cache lines, the microprocessor is operable to:

generate an encryption key for each cache line, based on a key value identified by the task identifier and the relative address tag, and encrypt the data; and write the encrypted data back to the physical address in the external memory.

\* \* \* \* \*